US008130392B2

(12) United States Patent
Kato

(10) Patent No.: US 8,130,392 B2
(45) Date of Patent: Mar. 6, 2012

(54) DOCUMENT PROVIDING SYSTEM AND DOCUMENT MANAGEMENT SERVER

(75) Inventor: Kazunori Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1531 days.

(21) Appl. No.: 11/212,642

(22) Filed: Aug. 29, 2005

(65) Prior Publication Data

US 2006/0044607 A1     Mar. 2, 2006

(30) Foreign Application Priority Data

Aug. 31, 2004  (JP) .............................. 2004-252903
Aug. 12, 2005  (JP) .............................. 2005-234702

(51) Int. Cl.
   G06F 3/12   (2006.01)
   G06F 15/00  (2006.01)
   G06F 7/04   (2006.01)
   G06K 1/00   (2006.01)
(52) U.S. Cl. ........................ 358/1.15; 358/1.9; 726/27
(58) Field of Classification Search .................. None
   See application file for complete search history.

(56) References Cited

U.S. PATENT DOCUMENTS

| 5,671,428 | A |   | 9/1997 | Muranaga et al. ............ 395/772 |
| 5,675,782 | A | * | 10/1997 | Montague et al. ................ 726/4 |
| 6,170,060 | B1 |   | 1/2001 | Mott et al. ...................... 713/201 |
| 6,453,129 | B1 | * | 9/2002 | Simpson et al. ................. 399/23 |
| 6,625,265 | B2 | * | 9/2003 | Kesten et al. ............ 379/100.11 |
| 6,792,547 | B1 | * | 9/2004 | Murata et al. ..................... 726/5 |
| 2003/0014368 | A1 | * | 1/2003 | Leurig et al. ..................... 705/64 |
| 2003/0030842 | A1 | * | 2/2003 | Suyehira ....................... 358/1.15 |
| 2003/0206311 | A1 | * | 11/2003 | Konsella et al. ............. 358/1.14 |
| 2004/0117655 | A1 | * | 6/2004 | Someshwar ................. 713/201 |

FOREIGN PATENT DOCUMENTS

| JP | 5-054036 | 3/1993 |
| JP | 9-146843 | 6/1997 |
| JP | 2001-016383 | 1/2001 |
| JP | 2001-519562 | 10/2001 |
| JP | 2002-175241 | 6/2002 |
| JP | 2002-229939 | 8/2002 |

OTHER PUBLICATIONS

Japanese Office Action dated Dec. 7, 2009 in corresponding Japanese Application No. 2005-234702.

* cited by examiner

*Primary Examiner* — King Poon
*Assistant Examiner* — Ming Hon
(74) *Attorney, Agent, or Firm* — Fitzpatrick, Cella, Harper & Scinto

(57) ABSTRACT

A document management server of this invention includes a storage unit which stores output device management information and document management information, the output device management information associating, for each output device, a group to which the output device belongs and a device-corresponding-group as a group made to correspond to the output device, and the document management information associating, for each document file, a group to which the document file belongs and a document-corresponding-group as a group made to correspond to the document file, an output permission determination unit which refers to the output device management information and the document management information in accordance with an instruction to output a designated document file from a designated output device, and determines that output is permitted when a group to which the designated document file belongs is contained in a device-corresponding-group associated with the designated output device, and a group to which the designated output device belongs is contained in a document-corresponding-group associated with the designated document file, and a transmission unit which transmits the designated document file to the designated output device when it is determined by the output permission determination unit that output is permitted.

7 Claims, 28 Drawing Sheets

FIG. 10 iCPS_MEAP_DEMO

☆ iCPS

PRINT DOCUMENT

PRINTABLE

THUMBNAIL

- DOCUMENT NAME
  △ SECTIONAL MEETING MATERIAL 1
- NUMBER OF COPIES
  INPUT BY TEN-KEY IS ALSO POSSIBLE
  [ − ] [ 1 ] [ + ]  ~1004
- FEE
  △ ¥3,000

DETAILED INFORMATION ▲

CHANGE PRINT FORMAT ▲ ~1003
1002

BACK

▼

START PRINT ⏎

1001~

SYSTEM STATUS / STOP ▲

FIG. 15

| | |
|---|---|
| DOCUMENT INFORMATION | ~1500 |
| DOCUMENT ID | ~1501 |
| DOCUMENT NAME | ~1502 |
| REGISTRATION USER ID | ~1503 |
| REGISTRATION DATE / TIME | ~1504 |
| PRINT SIZE | ~1505 |
| PRINT SURFACE | ~1506 |
| PAGE LAYOUT | ~1507 |
| COLOR / MONOCHROME | ~1508 |
| PUBLIC SETTING | ~1509 |
| VALID DATE | ~1510 |
| POSSIBLE NUMBER OF TIMES OF PRINTING | ~1511 |
| NUMBER OF TIMES OF PRINTING | ~1512 |
| PRINT FORMAT CHANGE ENABLE FLAG | ~1513 |
| PASSWORD | ~1514 |
| NUMBER OF PAGES | ~1515 |
| DOCUMENT FILE SIZE | ~1516 |
| DOCUMENT FILE DATA REFERENCE INFORMATION | ~1517 |

FIG. 16

| USER INFORMATION | ~1600 |
|---|---|
| USER ID | ~1601 |
| LOGIN ID | ~1602 |
| PASSWORD | ~1603 |
| USER'S DOMAIN NAME | ~1604 |
| PUBLIC DOCUMENT REGISTRATION LIMITATION | ~1605 |
| USABLE CAPACITY | ~1606 |

FIG. 17

| USER MANAGEMENT | | |
|---|---|---|
| 1701 — DOMAIN NAME : DomainA | | |

| USER ID | LOGIN ID | LIMITATION |
|---|---|---|
| 0000011 | 201 | OFF |
| 0000122 | 202 | Private |
| 0000122 | 203 | OFF |

1702 — (row highlighted: 0000122 202 Private)

1703 — ☑ LIMIT REGISTRATION OF PUBLIC DOCUMENT

[ ADD USER ]  [ DELETE USER ]  [ CANCEL ]  [ OK ]

FIG. 18

| DOMAIN MANAGEMENT | |
|---|---|
| 1801 — DOMAIN NAME : DomainA | |
| 1802 — ☑ SET Limited Public | |
| 1803 — | DomainB, DomainC |
| 1804 — ☑ SEPARATELY SET Limited Public OF PRINTING DEVICE | |
| 1805 — | * |
| 1806 — ☑ REQUIRE PASSWORD AUTHENTICATION FOR DOCUMENT WITH PUBLIC SETTING "Public" | |
| | CANCEL    OK |

FIG. 21

| | |
|---|---|
| DOMAIN INFORMATION | ~2100 |
| DOMAIN NAME | ~2101 |
| Limited Public OF REGISTERED DOCUMENT | ~2102 |
| Limited Public OF PRINTING DEVICE | ~2103 |
| PASSWORD NECESSITY FLAG IN PUBLIC DOCUMENT REGISTRATION | ~2104 |

FIG. 22

|  |  | DEVICE OF DOMAIN A | DEVICE OF DOMAIN B | DEVICE OF DOMAIN C |
|---|---|---|---|---|
| DOCUMENT OF DOMAIN A | Public | ○ (2201) | ○ (2202) | × (2203) |
|  | Private | ○ (2204) | × (2205) | × (2206) |
| DOCUMENT OF DOMAIN B | Public | ○ (2207) | ○ (2208) | ○ (2209) |
|  | Private | × (2210) | ○ (2211) | × (2212) |
| DOCUMENT OF DOMAIN C | Public | × (2213) (LIMITATION ON DEVICE SIDE) | ○ (2214) | ○ (2215) |
|  | Private | × (2216) | × (2217) | ○ (2218) |

○ : PRINTING PERMITTED
× : PRINTING INHIBITED

Limited Public OF DOMAIN A (A, B)
Limited Public OF DOMAIN B (A, B, C)
Limited Public OF DOMAIN C (NOT SET)
WHEN DEVICE IS Public

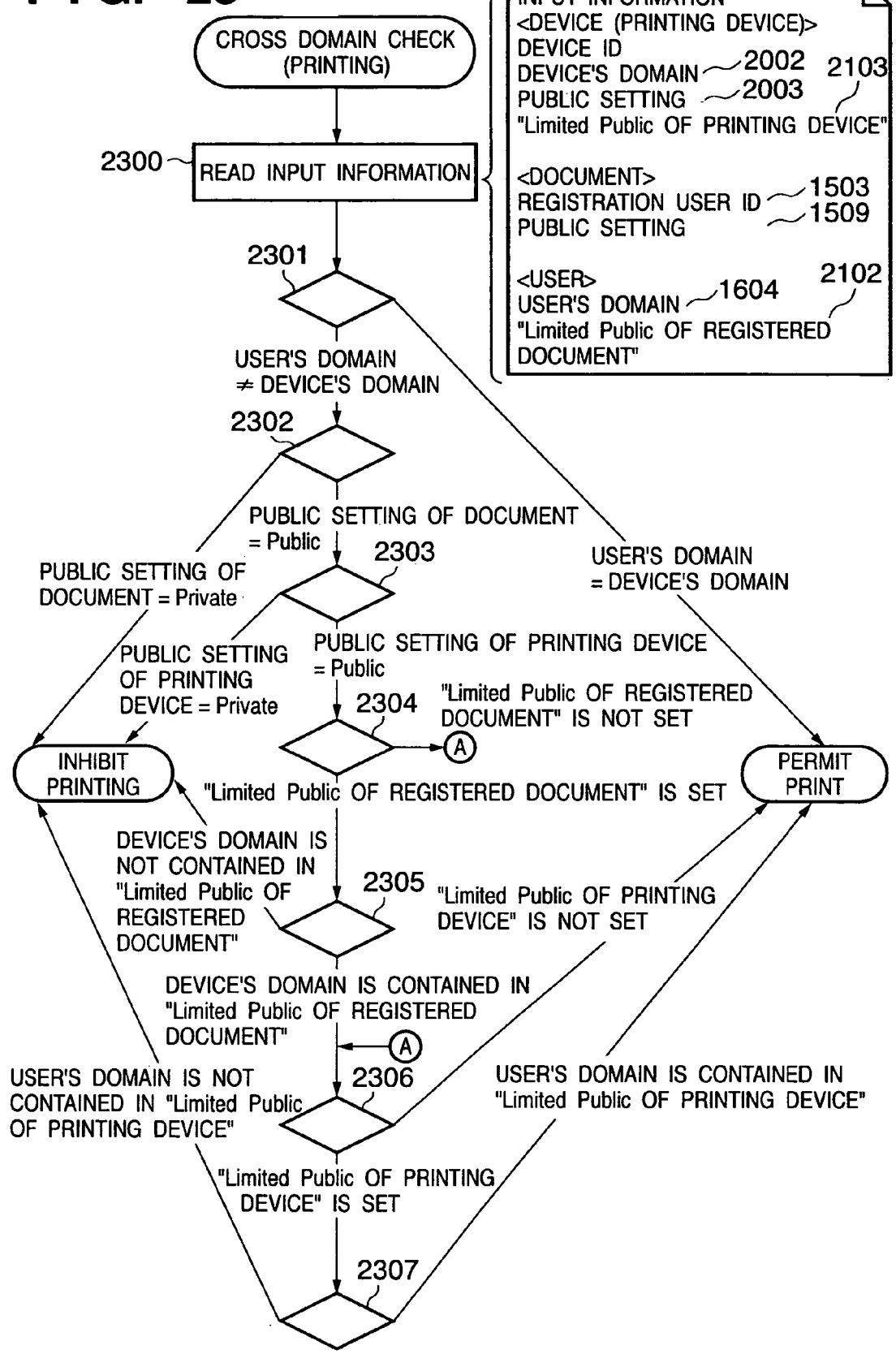

DOCUMENT PROVIDING SYSTEM AND DOCUMENT MANAGEMENT SERVER

FIELD OF THE INVENTION

The present invention relates to a document providing system and document management server to, e.g., save a document registered by a user and provide a desired document at a timing desired by the user by causing a printing device arranged at a location to print and output the document.

BACKGROUND OF THE INVENTION

In recent years, various kinds of documents are provided through electronic communication networks such as the Internet. Especially, remote print services using electronic communication networks have been proposed and implemented recently. In a remote print service, print terminals such as a multi-functional printing device and multi-functional copying machine are installed in stores such as a convenience store, companies, and public facilities. Documents managed by the central host are printed and output from the multi-functional printing devices or copying machines through an electronic communication network. For example, a service has also been proposed in which documents uploaded to the host in advance are printed and output from printing devices installed in convenience stores and public facilities located at various places.

Japanese Patent Laid-Open No. 2002-175241 describes a document providing apparatus which implements printing through a communication network in accordance with a print request from a user. This document providing apparatus receives a document reservation instruction containing a user identifier and document identifying information and saves a document specified by the document identifying information in correspondence with the user identifier. Upon receiving a document output instruction containing a user identifier from a printing device through a communication network, the document providing apparatus transmits a document saved in correspondence with the user identifier to the printing device through the communication network.

Japanese Patent Laid-Open No. 2002-229939 describes a system which sets limitation information for data processing of document data in correspondence with each operation such as print, copy, or editing and adds the information as control data to limit operations possible for the document data.

These conventional document providing systems cannot limit users who can use a specific printing device or devices capable of printing document data uploaded by a user. That is, the range of the service is common to all users or all printing devices. Hence, for example, users who can use a printing device owned by a company cannot be limited to users in the company. Alternatively, only a specific printing device installed in, e.g., the lobby of a company cannot be opened to specific users such as users in an affiliated company or customer company.

Consider a system to provide a function of allowing any person except a user who has registered a document to print the document by designating the document ID. In this case, printing devices capable of printing a designated document cannot be limited to printing devices installed in specific places such as a company or affiliated company. Even in the conventional document providing systems, the functions can be provided as separate services. However, the flexibility decreases because printing devices installed in public spaces such as convenience stores and public facilities cannot print.

SUMMARY OF THE INVENTION

The present invention has been made in consideration of the above-described problems, and has as its object to provide a document providing system and document management server in a system to transmit a document from a predetermined server apparatus to a printing device installed in, e.g., a company, store, or hotel and cause the printing device to print and output the document, which can ensure a high security level by limiting printing devices capable of outputting a document and prevent any illicit use by limiting documents outputtable by a printing device without degrading the convenience by controlling, for each document data registered by a user, the print possibility in a printing device belonging to a domain (group) different from the domain (group) of the user.

In order to achieve the above object, in the present invention, a concept of "domain" which brings one or a plurality of users and one or a plurality of printing devices together is introduced. The concept "domain" is the same as "group". In the present invention, "domain" and "group" are used in the same sense unless otherwise specified. That is, "domain" can be replaced with "group" and vice versa without any difference in its sense unless otherwise specified.

For a document, a group (domain) to which a printing device permitted to print the document is set in advance. For a printing device, the group (domain) of a document which can be output from the printing device is set in advance. It is checked whether the group (domain) of the document has a permission for output from the printing device and the group (domain) of the printing device has a permission for output of the document (cross group check=cross domain check).

For this purpose, the present invention has the following arrangement. A document management server comprises a storage unit which stores output device management information and document management information, the output device management information associating, for each output device, a group to which the output device belongs and a device-corresponding-group as a group made to correspond to the output device, and the document management information associating, for each document file, a group to which the document file belongs and a document-corresponding-group as a group made to correspond to the document file, an output permission determination unit which refers to the output device management information and the document management information in accordance with an instruction to output a designated document file from a designated output device, and determines that output is permitted when a group to which the designated document file belongs is contained in a device-corresponding-group associated with the designated output device, and a group to which the designated output device belongs is contained in a document-corresponding-group associated with the designated document file, and a transmission unit which transmits the designated document file to the designated output device when the output permission determination unit determines that output is permitted.

Alternatively, a document management server comprises a storage unit which stores output device management information, document management information, and user management information, the output device management information associating, for each output device, a group to which the output device belongs and a device-corresponding-group as a group made to correspond to the output device, the document management information associating, for each document file, a group to which the document file belongs and a document-corresponding-group as a group made to correspond to the document file, and the user management information associating, for each user ID, a group to which the user ID belongs and a user-corresponding-group as a group made to correspond to the user ID, a list permission determination unit which refers to the output device management information and the user management information in accordance with an instruction to output a list of designated document files from a designated output device, the instruction being input together with a user ID, and permits output of the list when a group to which a user associated with the user ID belongs is contained in a device-corresponding-group associated with the designated output device, and a group to which the designated output device belongs is contained in a user-corresponding-group associated with the user ID, and a creation unit which creates the list of the designated document files when the list permission determination unit permits output of the list.

Alternatively, a document providing system comprises a document registration unit which receives a document registration instruction containing a user identifier, a document file, and document attribute information from a user through a communication network, a document ID issuing unit which issues a document ID to uniquely identify a registered document and presenting the document ID to the user, a document saving unit which saves the document file, the document attribute information, and the document ID in correspondence with the user identifier, and a document transmission unit which receives a document output instruction containing a document ID from a printing device through the communication network, acquires a document file and document attribute information corresponding to the document ID from the document saving unit, and transmits the document file and the document attribute information to the printing device through the communication network.

According to the above-described arrangement, a high security level can be ensured by limiting printing devices capable of outputting a document. In addition, any illicit use can be prevented by limiting documents outputtable by a printing device.

Furthermore, with simple setting not to degrade the convenience, printing devices, users, and documents can more efficiently and effectively be managed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view showing an example of a print setting designation window in the print instruction of the document providing system according to the embodiment of the present invention;

FIG. 15 is a view for explaining an example of a document information saving form in a document providing system server;

FIG. 16 is a view for explaining an example of a user information saving form in the document providing system server;

FIG. 17 is a view showing an example of a user management window in the document providing system server;

FIG. 18 is a view showing an example of a domain management window in the document providing system server;

FIG. 21 is a view for explaining an example of a domain information saving form in the document providing system server;

FIG. 22 is a view showing an example of a cross domain check result in the document providing system server;

FIG. 23 is a flowchart showing the flow of cross domain check for printing in the document providing system server;

DETAILED DESCRIPTION OF THE PREFERRED EMBODIMENTS

First Embodiment

Definition

Terms used in this embodiment will be described. A "public document" in this embodiment indicates a document which is registered as a public document in an information processing system of the present invention. More specifically, a document whose public setting is set to "public" is a public document. This registration is called public registration.

A "public domain" in this embodiment means a domain registered in "Limited Public" setting of domain information of a domain. A user belonging to the public domain has authority to use a printing device or a document belonging to the domain to which the public domain is registered, as described in this embodiment.

In the present invention, a concept of "domain" which brings one or a plurality of users and one or a plurality of printing devices together is introduced. "Domain" has the same meaning as general "group". In the present invention, "domain" is synonymous with "group" unless otherwise specified. That is, "domain" can be replaced with "group" and vice versa without any difference in its sense unless otherwise specified.

Arrangement of Document Providing System

Figure 1:
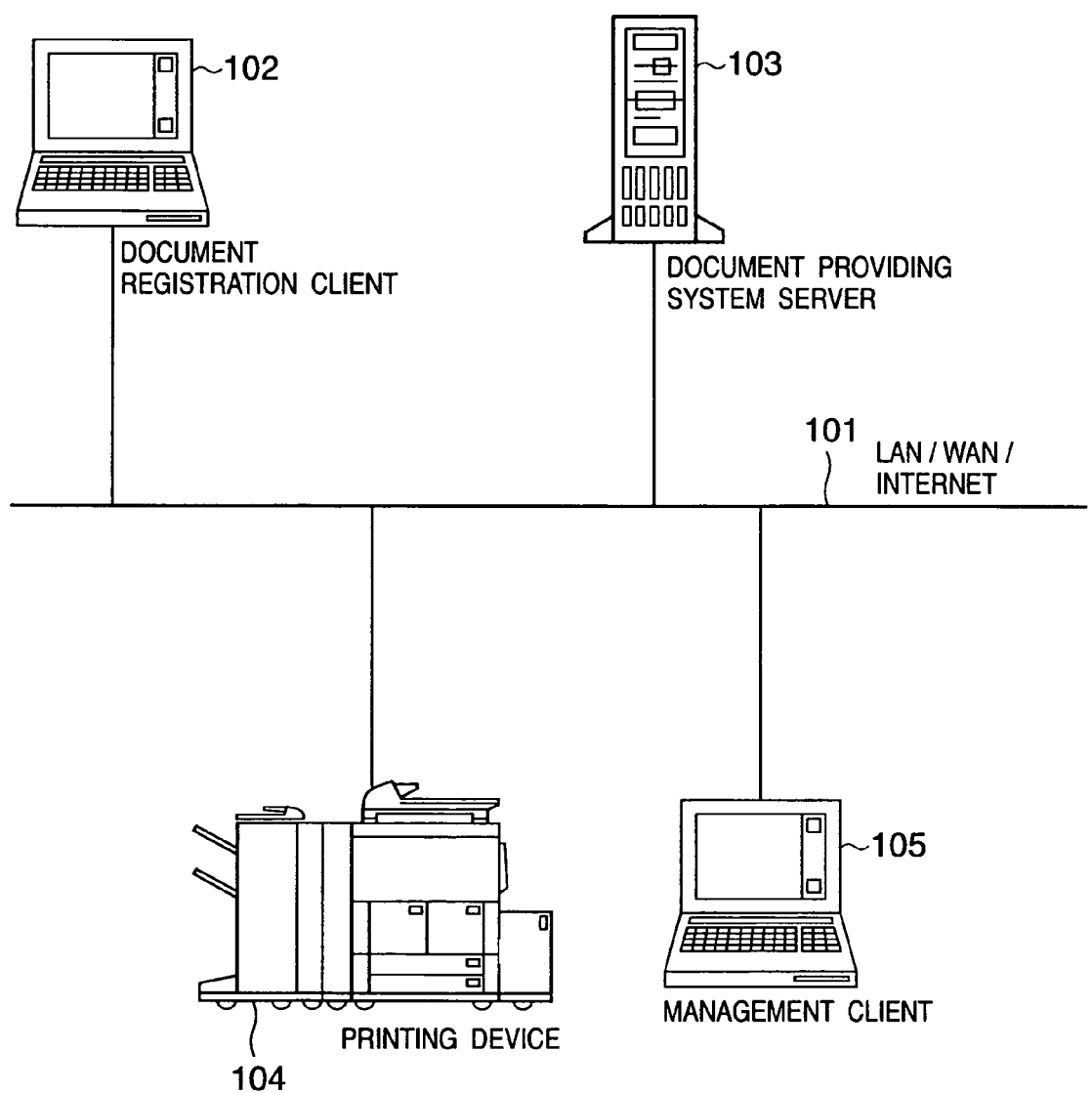
FIG. 1 is a block diagram showing the arrangement of a document providing system according to the embodiment of the present invention.

An embodiment of the present invention will be described below in detail. FIG. 1 is a block diagram for explaining the arrangement of an information processing system to which the present invention can be applied. Each of a document registration client 102, printing device 104, and management client 105 connected in this system is assumed to include one or a plurality of apparatuses.

Referring to FIG. 1, the document registration client 102, document providing system server 103, and management client 105 are information processing apparatuses capable of executing various kinds of programs such as an application program. The printing device 104 also has an information processing function and can execute various kinds of programs such as an application program. The document registration client 102, document providing system server 103, printing device 104, and management client 105 are connected to a LAN/WAN/Internet 101 through network cables so that they can communicate with each other.

The printing device 104 is a printer having a print control device and analyzes a print job containing print data transmitted or acquired from a computer, converts the data into dot image for each page, and prints each page. As the printing device 104, printers of various types can be used, including a laser beam printer using an electrophotographic method and an ink-jet printer using an ink-jet method. A printer for large-format printing such as A0 can also be used.

If the printing device 104 has no information processing function capable of executing various kinds of programs such as an application program, a print control computer 106 (not shown) may be arranged separately from the printing device 104. The print control computer 106 has an information processing function capable of executing various kinds of programs such as an application program. The print control computer 106 receives a document print instruction from a user, communicates with the document providing system, and controls the printing device 104. The printing device 104 will indicate not only a printing device having an information processing function but also an arrangement including a printing device and a print control computer hereinafter.

The document providing system server 103 is an application server to manage user, document, and printing device information. The document providing system server 103 saves pieces of information about a document such as an owner, document ID, document file, and document attribute information and allows a user to refer to them. The document providing system server 103 may have a Web server function such that the document registration client 102 or management client 105 can access the document providing system server 103 by using a Web browser. Alternatively, the document registration client 102, printing device 104, or management client 105 may connect to the document providing system server 103 by using a communication protocol such as TCP/IP or HTTP from a dedicated application (it can be any application other than a Web browser) running on the apparatus (TCP/IP on the LAN is used in this embodiment although the communication protocol is not particularly limited).

A user who wants to register a document designates a document attribute, document file, and the like from the document registration client 102 via a Web browser/application and executes a registration operation in the document providing system server 103. A user who wants to print a document (the user may be the same as the user who registers the document) refers to and downloads document information, document file, and the like from the document providing system server 103 via a print instruction application from the printing device 104 and executes an operation such as print. A manager who manages users executes a user management operation from the management client 105 via a Web browser/application.

Figure 2:
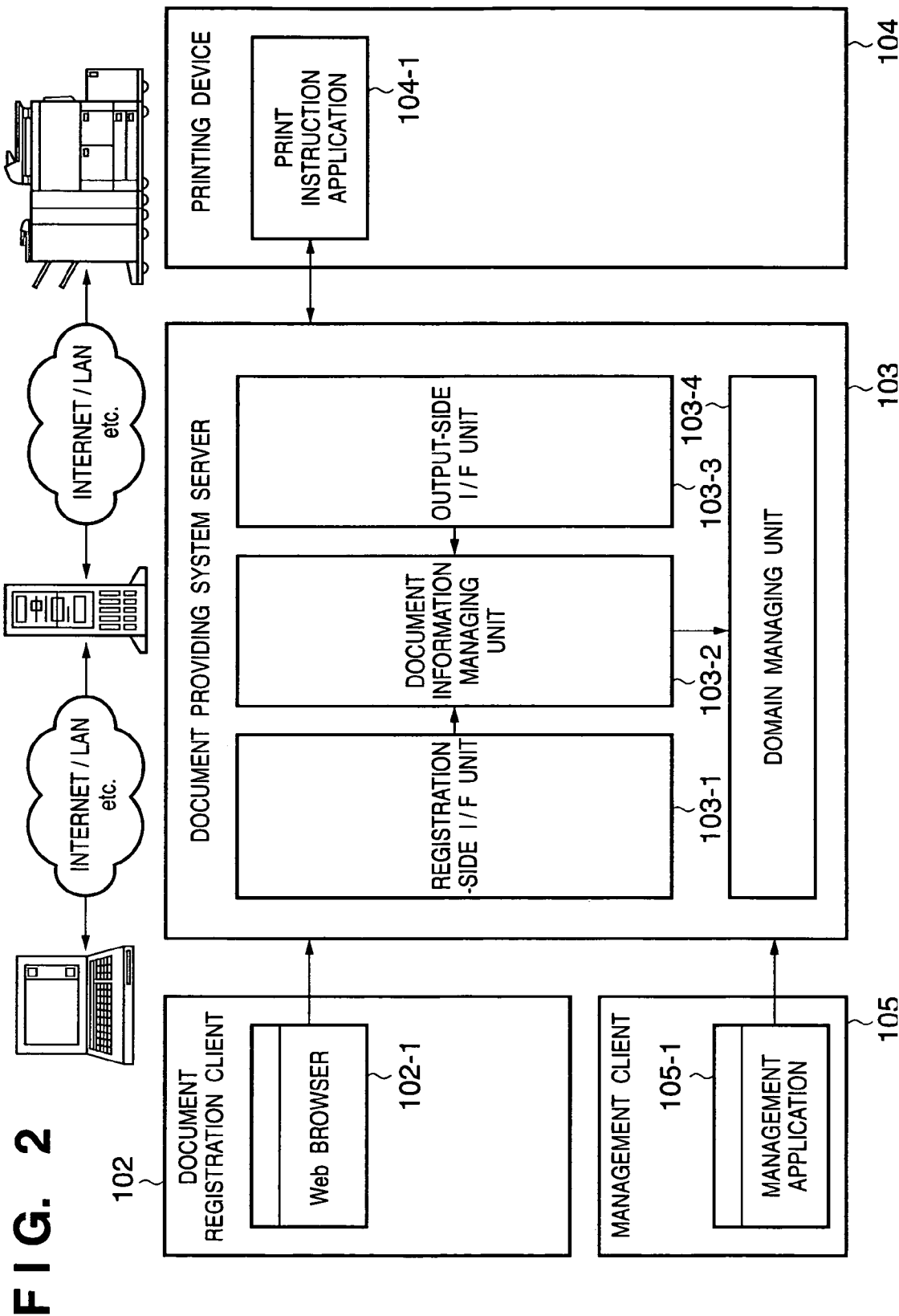
FIG. 2 is a block diagram showing the module arrangement of the document providing system according to the embodiment of the present invention.

FIG. 2 is a block diagram for explaining the module arrangement of the system according to the present invention. Main component modules will be described first.

A Web browser 102-1 runs on the document registration client 102. A registration-side I/F unit 103-1 is an interface unit of the document providing system server 103 for the document registration client. The registration-side I/F unit 103-1 has a Web server function and can receive a request by HTTP or HTTPS. A document information managing unit 103-2 pairs document information with a document file and saves and manages them in association with a registration user identifier. An output-side I/F unit 103-3 is an interface unit for the printing device (including a print control computer to control the printing device) and can receive a request by HTTP or HTTPS, like the registration-side I/F unit 103-1. A domain managing unit 103-4 manages user information and printing device information.

A print instruction application 104-1 runs on the printing device 104. The print instruction application 104-1 provides a function of displaying document information received from the document providing system server 103 and instructing printing of a document file and a function of receiving a document file from the document providing system server 103 and printing the document file. A management application 105-1 runs in the management client 105. The management application 105-1 communicates with the domain managing unit 103-4 and provides a user management function and a printing device management function. These components can be implemented by causing computers to execute programs to implement predetermined procedures.

Structure of Document Information

FIG. 15 shows the format of a data file to store document information which is created and managed by the document information managing unit 103-2. As document information, a user ID 1503 of a user who has registered the document, print format settings 1505, 1506, 1507, and 1508, and public setting 1509 are managed in association with a document ID 1501. The document file is also managed in association, though it is managed separately from the document information. The document information holds document file data reference information 1517. However, the document file may be held in the document information. Document information is created and registered in association with each document file every time a document is registered in the document providing server by a client. The document ID 1501 is preferably uniquely added to each document file by the document providing server. As the user ID, the ID of the user who has done the registration operation is recorded at that time. A print attribute such as a public setting 1510 can be changed from the client. As the public setting 1509, "public" or "private" can be selected in this embodiment. A document whose public setting is set to "public" is called a public document. When "public" is selected, "limited public" may be set sometimes depending on setting of domain information shown in FIG. 21.

Structure of User Information

FIG. 16 shows the format of a data file to store user information which is created and managed by the domain managing unit 103-4. As user information, a user ID 1601 to uniquely identify a user, a login ID 1602, a password 1603, a domain 1604 to which the user belongs, public document registration limitation 1605, and usable capacity 1606 (total registrable document size) are managed in association with each other. User information is created for each user when a new user is registered in the document providing system. The domain 1604 and the like are designated at the time of user registration and can be changed later.

Structure of Printing Device Management Information

Figure 20:
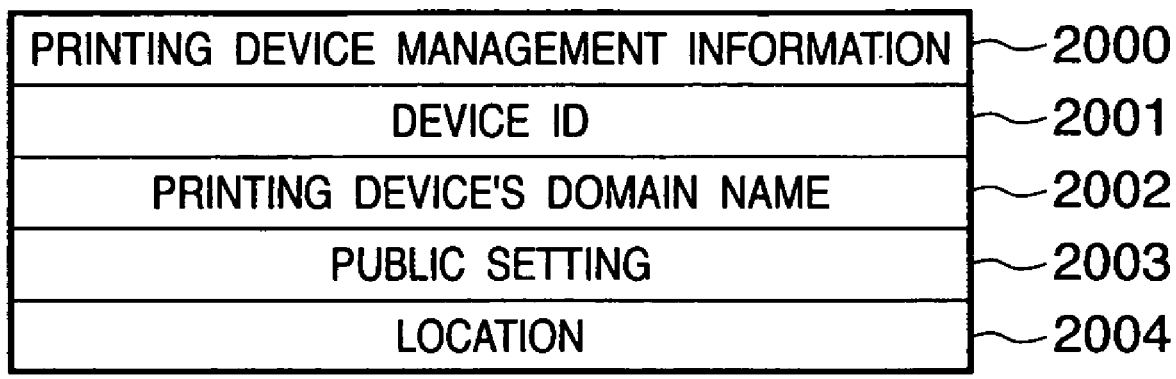
FIG. 20 is a view for explaining an example of a printing device management information saving form in the document providing system server.

FIG. 20 shows the format of a data file to store printing device management information 2000 which is created and managed by the domain managing unit 103-4. As printing device management information, a device ID 2001 to uniquely identify a printing device, a printing device's domain 2002, public setting 2003, and location information 2004 are managed in association with each other. Printing device management information is created when a printing device usable in the document providing system is registered in the document providing server. The printing device's domain 2002 can be either designated or determined in accordance with the installation place. As the public setting, "public" or "private" can be selected in this embodiment. When "public" is selected, "limited public" may be set sometimes depending on setting of domain information shown in FIG. 21. The public setting and the like can be changed after registration.

Structure of Domain Management Information

FIG. 21 shows the format of a data file to store domain management information which is created and managed by the domain managing unit 103-4. As domain management information, a domain name 2101 to uniquely identify a domain, Limited Public setting 2102 of a registered document, Limited Public setting 2103 of a printing device, and a password flag 2104 are managed in association with each other. The Limited Public setting 2102 of a registered document is referred to when the public setting of a document is "public". The domain management information of a domain to which the document belongs is referred to. When a domain is registered in the Limited Public setting 2102 of the registered document, the domain is set as the range (domain) of publication of the document. The Limited Public setting 2103 of a printing device is referred to when the public setting of a printing device is "public". The domain management information of a domain to which the printing device belongs is referred to. When a domain is registered in the Limited Public setting 2103 of the printing device, the domain is set as the range (domain) of publication of the printing device.

Figure 24:
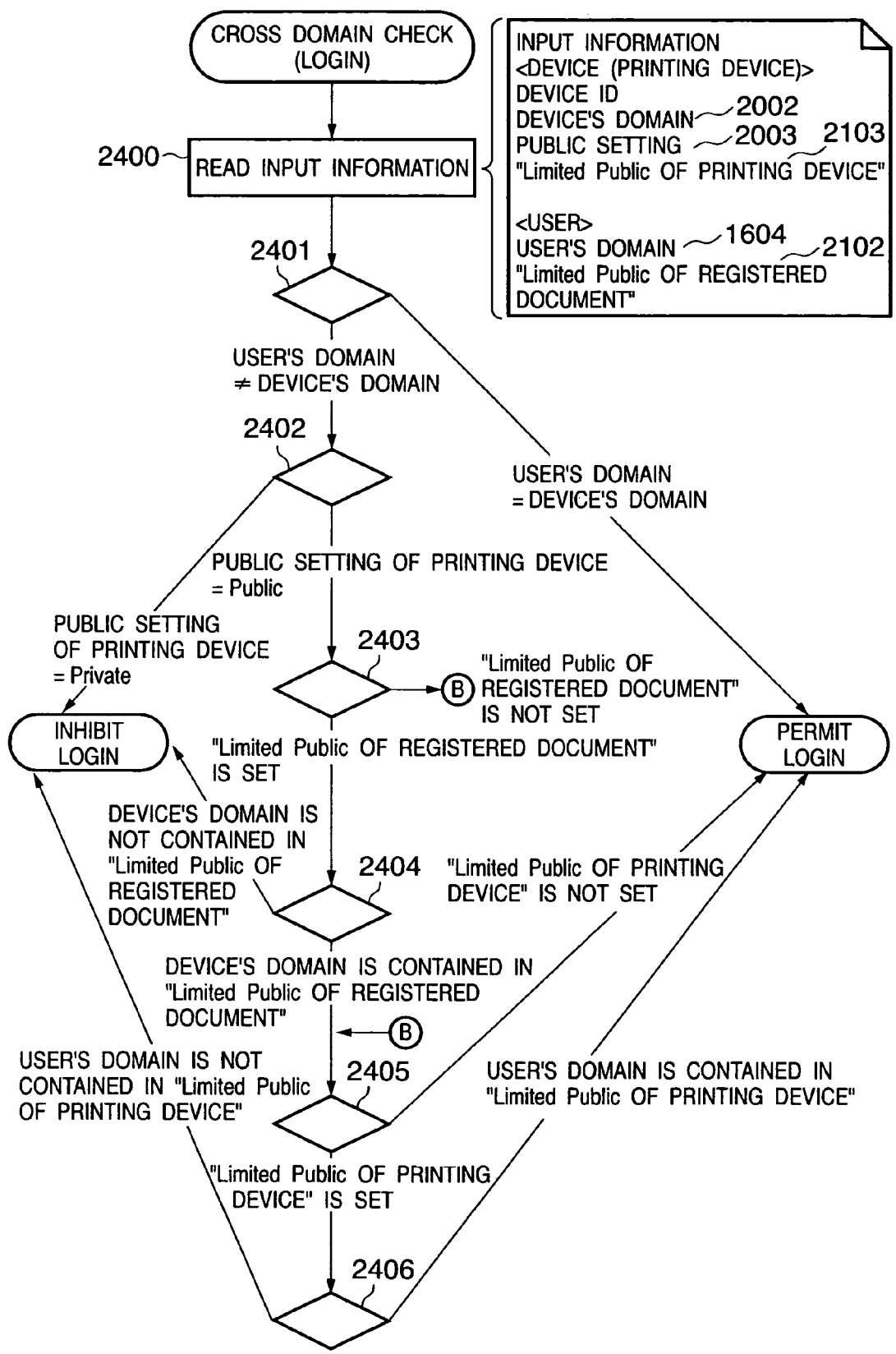
FIG. 24 is a flowchart showing the flow of cross domain check for login in the document providing system server.

The Limited Public setting 2102 of a registered document is also used for user authentication, as shown in FIG. 24. In this case, the Limited Public setting of the registered document is used not in the sense of the word but as the limited public setting of a user who belongs to the domain.

User Management

User management executed by operating the management client 105 will be described next with reference to FIGS. 16 and 17. A domain management user who executes user management accesses the domain managing unit 103-4 by operating the Web browser or management application 105-1 running on the management client 105. FIG. 17 shows an example of a user management window displayed at this time. A name 1701 of a domain subjected to the current management operation is displayed in the user management window. A user list 1702 currently registered in the domain managed by the domain management user is displayed under the domain name. When a user is selected on the list 1702, detailed information of the selected user is displayed under the list, and various kinds of settings can be done. In this example, the user ID 1601, login ID 1602, and public document registration limitation 1605 (limitation) in the user information management table shown in FIG. 16 are displayed. As a settable item 1703, a check box to "limit public document registration" for the selected user is displayed.

With the check box 1703 shown in FIG. 17, the public document registration limitation 1605 of the user can be changed. If the public document registration limitation 1605 is ON, the user can select only Private as the public setting 1509 of the document attribute at the time of document registration. With this setting, a limitation can be placed on a temporary system user in, e.g., a coffee shop to allow him/her to print a registered document only in that coffee shop.

Management of Domain Setting

Domain setting management executed by operating the management client 105 will be described next with reference to FIGS. 18 and 21. A domain management user who executes domain setting management accesses the domain managing unit 103-4 by operating the Web browser or management application 105-1 running on the management client 105. FIG. 18 shows an example of a domain setting management window displayed at this time. A name 1801 of a domain subjected to the current management operation is displayed in the domain setting management window. With a check box 1802, whether to set Limited Public for the domain can be selected. When the check box 1802 is checked to "set Limited Public", a domain range to be set to Limited Public is set by designating a plurality of domains in a domain registration field 1803. When a check box 1804 to "separately set Limited Public of a printing device" is checked, the Limited Public 2102 of a registered document and the Limited Public 2103 of a printing device can be set as separate domain ranges. In this case, the Limited Public of the printing device is set in a field 1805. With a check box 1806, the password flag 2104 can be set. When the check box 1806 is checked, the password flag 2104 is turned on. In this case, when the user belonging to the domain sets the public setting of a document to Public in registering the document in the document providing server, password setting for access to the document can be made essential.

The domain names set in the field 1803 in FIG. 18 are registered in the Limited Public setting 2102 of the registered document contained in domain information 2100. The domain names set in the field 1805 are registered in the Limited Public setting 2103 of the printing device contained in the domain information 2100. When the check mark in the check box 1804 is turned off, the contents of the Limited Public setting 2102 of the registered document are copied to the Limited Public setting 2103 of the printing device. When the check mark in the check box 1802 is turned off, the contents of the Limited Public setting 2102 of the registered document and the contents of the Limited Public setting 2103 of the printing device are cleared. When a flag corresponding to each check box is provided in the domain information instead of these operations, setting corresponding to operations can be done without copying or clearing the contents.

Management of Printing Device

Figure 19:
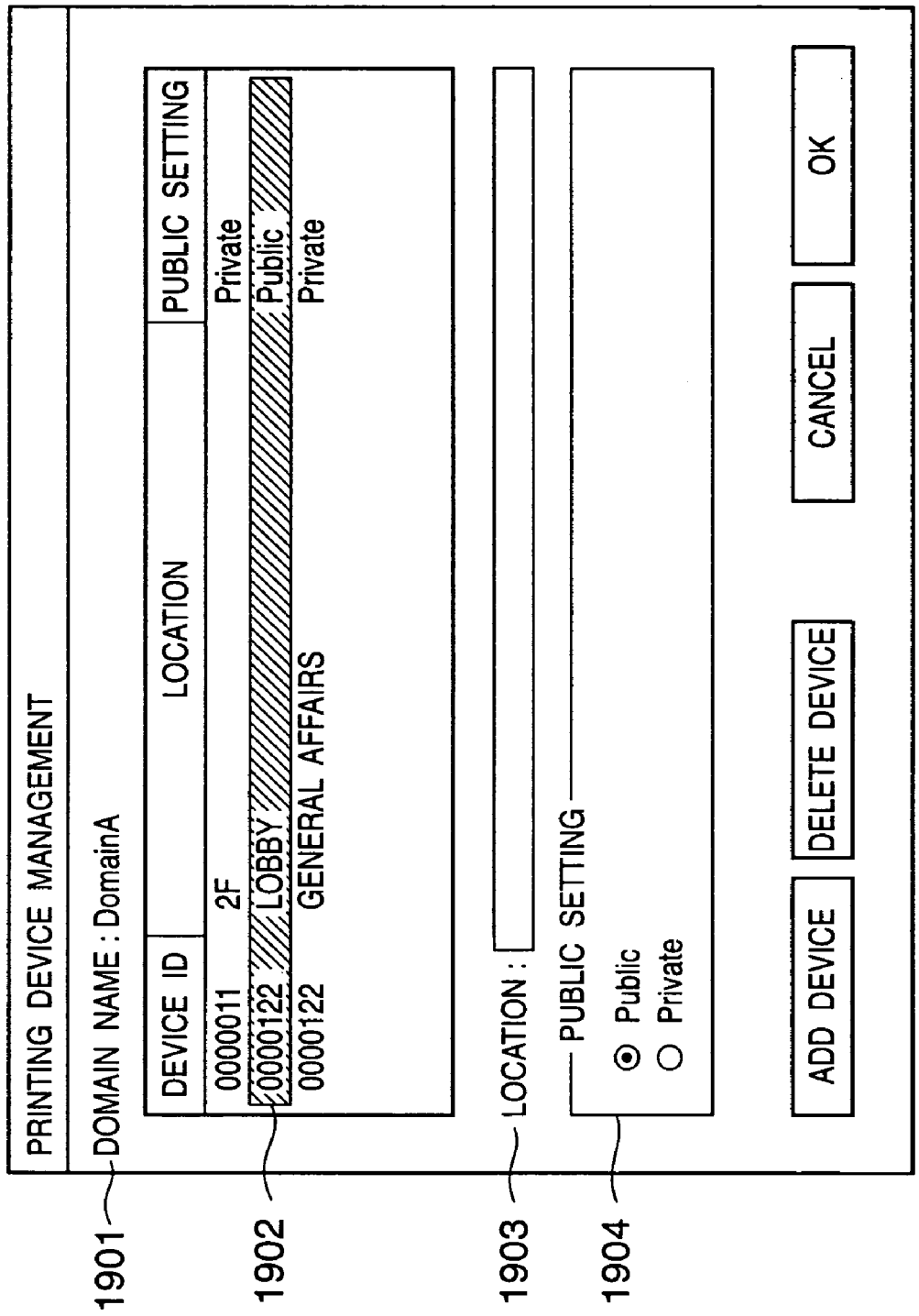
FIG. 19 is a view showing an example of a printing device management window in the document providing system server.

Printing device management executed by operating the management client 105 will be described next with reference to FIGS. 19 and 20. A domain management user who executes printing device management accesses the domain managing unit 103-4 by operating the Web browser or management application 105-1 running on the management client 105. FIG. 19 shows an example of a printing device management window displayed at this time. A name 1901 of a domain to which the printing device subjected to the current management operation belongs is displayed in the printing device management window. A list of printing devices currently registered in the domain managed by the domain management user is displayed as a list 1902. When a printing device is selected on the list 1902, detailed management information of the selected printing device is displayed under the list 1902, and various kinds of settings can be done via the information. In the printing device list 1902, the device ID 2001, location 2004, and public setting 2003 in the printing device management table shown in FIG. 20 are displayed.

In a public setting 1904 shown in FIG. 19, the public setting 2003 of the printing device can be changed. When the public setting 2003 of the printing device is Private, only documents registered by users who belong to the same domain as the printing device can be printed by that printing device. When the public setting 2003 of the printing device is Public, the following limitations are generated for printing using the printing device. When a domain is registered in the Limited Public setting 2103 of the printing device contained in the domain information 2100 of the domain to which the printing device belongs, only documents registered by users who belong to the domain and documents registered by users who belong to the same domain as the printing device can be printed. When no domain is registered in the Limited Public, all documents registered by users of any domains can be printed.

Even when a domain is registered in the Limited Public setting 2103 of the printing device in the domain information and the Limited Public setting 2102 of the registered document, the values of the public setting 2003 of the printing device and the public setting 1509 of the document designated at the time of document registration are Public or Private. When Public is designated as the public setting, a priority is given to the domain registered in the Limited Public of the domain information. Printing beyond the domain registered in the Limited Public is rejected.

How the Limited Public setting in the domain management information influences the print operation of a document when Public or Private is set in the public setting of a registered document will be described next with reference to FIG. 22. In the example shown in FIG. 22, the Limited Public setting of a registered document is the same as the Limited Public setting of a printing device. Hence, these settings will simply be called Limited Public setting below without any discrimination between them.

In the example shown in FIG. 22, domains registered in the Limited Public setting of a domain A are the domain A and a domain B. Domains registered in the Limited Public setting of the domain B are the domain A, domain B, and domain C. No domain is registered in the Limited Public setting of the domain C. Columns correspond to printing devices belonging to the domains A, B, and C. Public is set in the public setting contained in the management information of the printing devices. Rows indicate documents registered by users belonging to the domains A, B, and C. Public or Private is set in the public settings of the documents. Each field represents whether printing of the document by the printing device is possible or impossible.

Example of Cross Domain Check

In fields 2201, 2204, 2208, 2211, 2215, and 2218 in FIG. 22, the domains to which the users who have registered the documents belong are the same as the domains to which the printing devices to execute printing belong. Hence, the documents can be printed. In fields 2205, 2206, 2210, 2212, 2216, and 2217, the domains of the users who have registered the documents are different from the domains of the printing devices to execute printing. In addition, Private is set as the public settings of the documents. For this reason, printing is impossible. In fields 2202, 2207, 2209, and 2214, the domains of the users who have registered the documents are different from the domains of the printing devices to execute printing. However, Public is set as the public settings of the documents. In addition, the domains of the printing devices are contained in the Limited Public settings of the domains to which the users belong, or no Limited Public is set. Furthermore, the domains to which the users belong are contained in the domains registered in the Limited Public settings of the domains to which the printing devices belong, or no Limited Public is set. For this reason, the documents can be printed.

In a field 2203, no Limited Public is set for the domain C of the printing device. However, the domain C is not contained in the Limited Public setting for the domain A of the user who has registered the document. Hence, printing is impossible because of the limitation on the side of the domain A of the user who has registered the document.

In a field 2213, no Limited Public is set for the domain C of the user who has registered the document. However, the domain C is not contained in the Limited Public setting for the domain A of the printing device. Hence, printing is impossible because of the limitation on the side of the domain A of the printing device.

As described above, the document print enable/disable state is controlled by combining the Limited Public setting of the domain to which the user who has registered a document belongs, the public setting of the document, the Limited Public setting of the domain to which the printing device belongs, and the public setting of the printing device.

Document Registration Processing

The flow of document registration processing will be described below with reference to FIGS. 2, 3 to 7, and 25.

Figure 3:
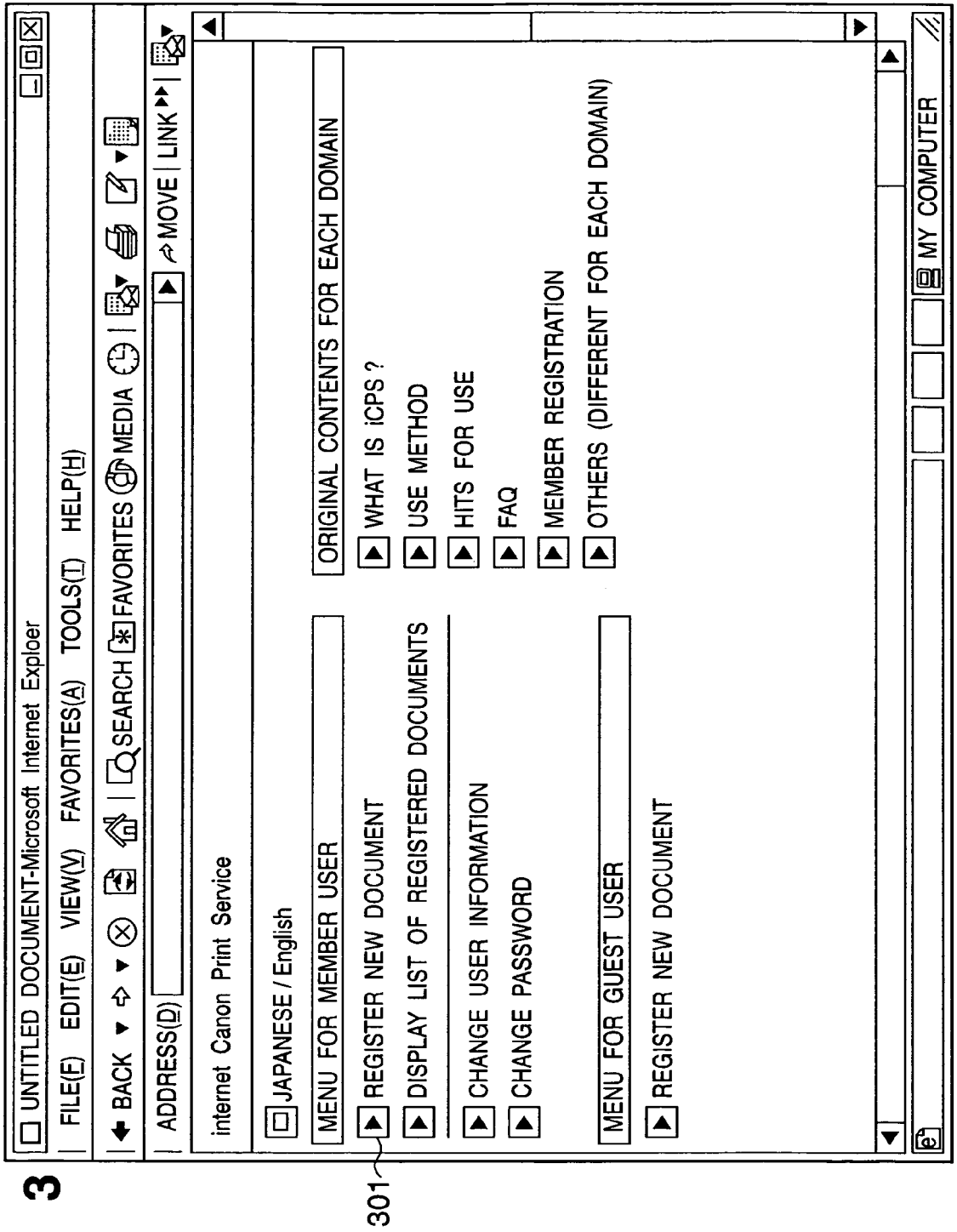
FIG. 3 is a view showing an example of a menu selection window in the document registration form of the document providing system according to the embodiment of the present invention.
Figure 4:
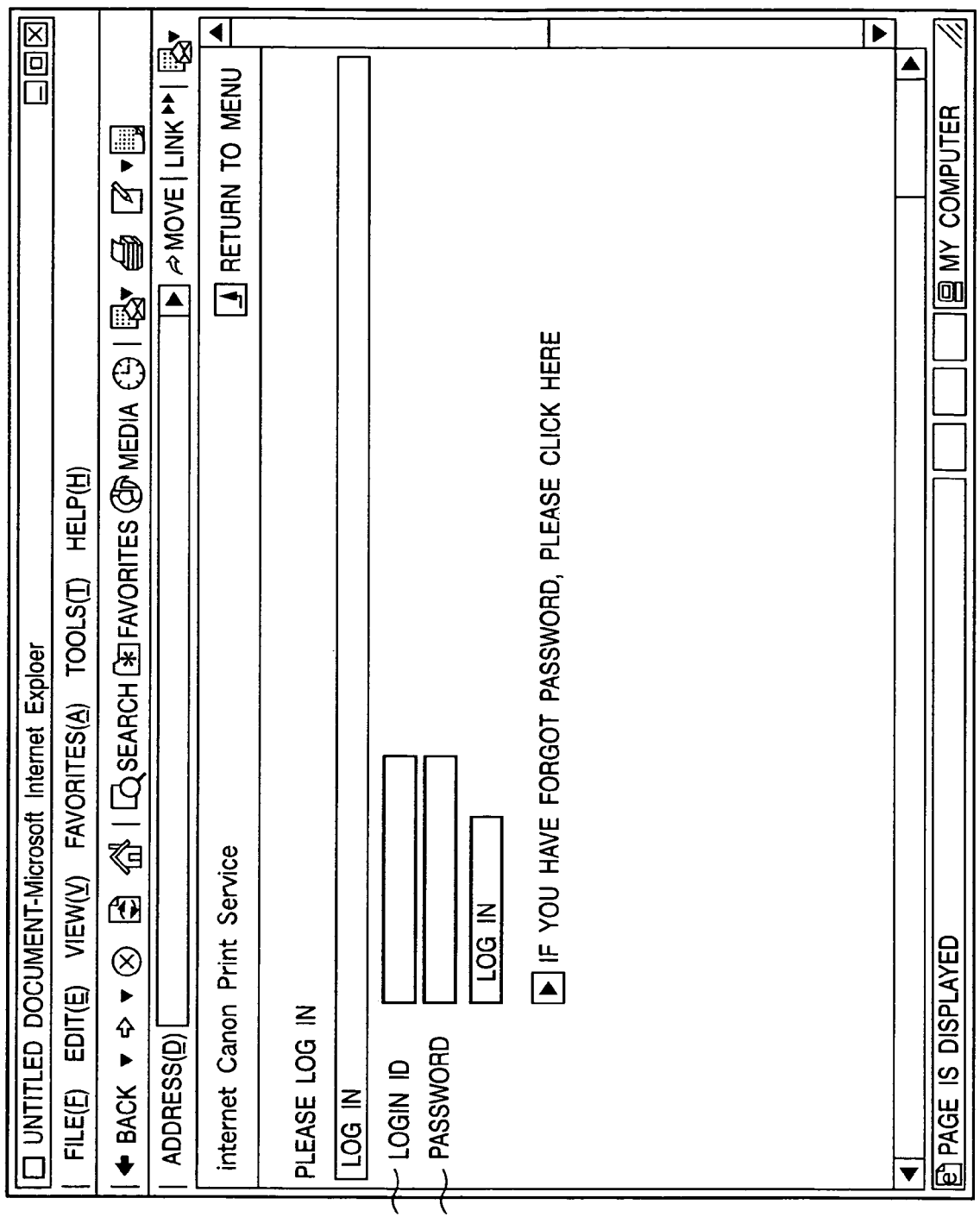
FIG. 4 is a view showing an example of a login window in the document registration form of the document providing system according to the embodiment of the present invention.
Figure 5:
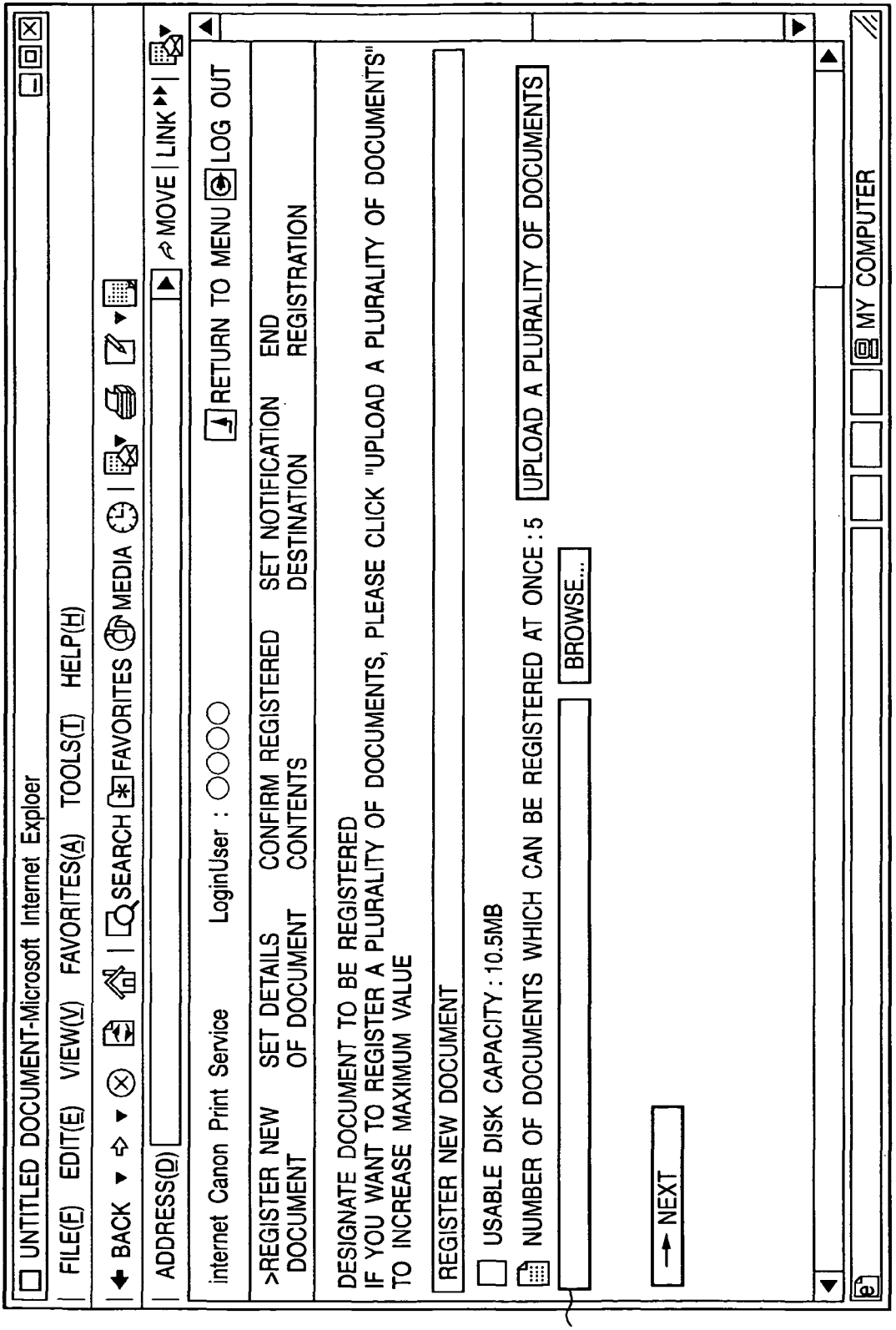
FIG. 5 is a view showing an example of a registration document designation window in the document registration form of the document providing system according to the embodiment of the present invention.
Figure 6:
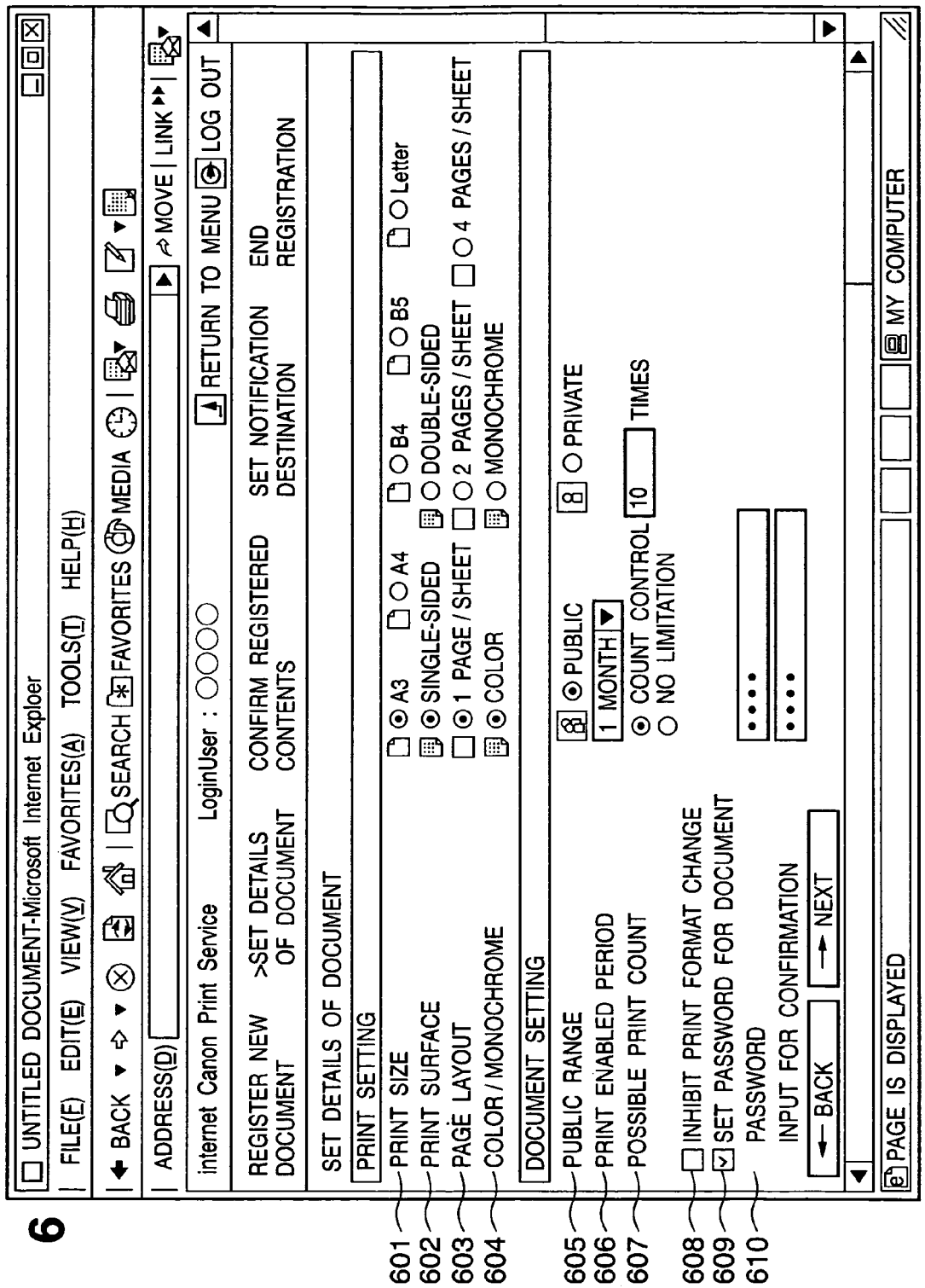
FIG. 6 is a view showing an example of a document attribute information designation window in the document registration form of the document providing system according to the embodiment of the present invention.

The user accesses the registration-side I/F (interface) unit 103-1 of the document providing system server 103 through the network 101 by operating the Web browser 102-1 running in the document registration client 102. A menu selection form is returned and displayed on the Web browser 102-1 (FIG. 3).

When the user selects a menu 301, i.e., "register new document" (S2501 in FIG. 25), menu selection information is set in the menu selection form and transmitted to the registration-side (i.e., on the side of the document providing server) I/F unit. The registration-side I/F unit returns a login window form (S2155 in FIG. 25). The login window form is displayed on the Web browser 102-1 (FIG. 4; S2502 in FIG. 25). The user inputs a login ID 401 and password 402 and clicks on the "login" button (S2503 in FIG. 25). Login information is set in the login window form and transmitted to the registration-side I/F unit 103-1. The login information is transferred to the domain managing unit 103-4 through the registration-side I/F unit 103-1, and user authentication processing is executed (S2512 and S2513 in FIG. 25). The authentication result is returned to the registration-side I/F unit 103-1. When it is confirmed that the user is registered in the system (S2513 in FIG. 25), a registration document designation form is returned (S2514 in FIG. 25) and displayed on the Web browser 102-1 (FIG. 5; S2504 in FIG. 25).

Figure 25:
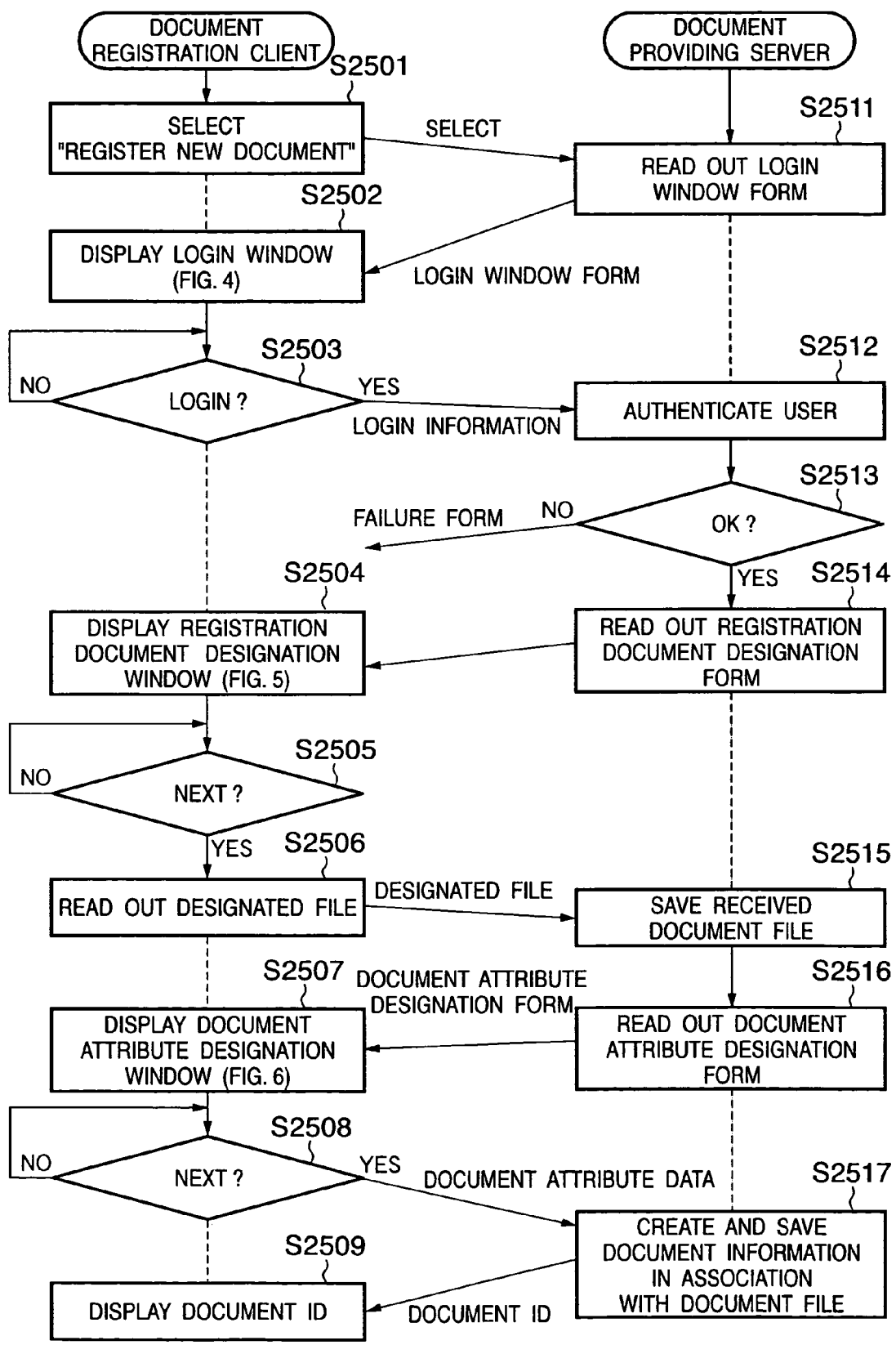
FIG. 25 is a sequence chart in registering a document in the document providing system server.

The user designates the registration file and path in a registration file designation field 501 in the registration document designation form and clicks on the "next" button (S2505 in FIG. 25). The document file designated in the registration file designation field 501 is read out and transmitted to the registration-side I/F unit 103-1 (S2506 in FIG. 25). The registration-side I/F unit 103-1 transfers the received document file to the document information managing unit 103-2. The document file is saved in the document information managing unit 103-2. The registration-side I/F unit 103-1 returns a document attribute information designation form (S2515 and S2516 in FIG. 25) which is displayed on the Web browser 102-1 (FIG. 6; S2507 in FIG. 25).

In the document attribute information designation form, a print size 601, print surface (single-sided/double-sided) 602, page layout 603, and color/monochrome 604 can be set as settings for printing of the document. With a check box 608 to set print format change enable/disable state in printing, print format designation in printing can be disabled such that the document is always printed in the print format designated at the time of registration. As a public setting 605 of the document, Public or Private can be set. However, when Private limitation is set as the public document registration limitation 1605 of the user who is logging in, Public cannot be designated as the public setting of the document to be registered. As other document settings, a print enabled period 606 and possible print count 607 can be designated. As the print enabled period 606, a period from document registration, during which the registered document can be printed, is designated. After the lapse of the print enabled period, the document is deleted so it cannot be printed anymore. As the possible print count 607, the possible number of times of printing of the registered document is set. When printing is executed a number of times equal to the designated possible print count, the document is deleted so it cannot be printed anymore. When the user checks a check box 609 and registers a password in a password field 610, the password can be set for the document. When the password to access the document is registered, the password is requested for printing of the document. If the input password is not correct, printing is rejected. With this function, even when a user except the user who has registered the document can print the document by designating the document ID, the document can be protected by requesting the document ID and password from him/her. When the password flag 2104 of the domain management information of the domain to which the login user belongs is ON, the user is forced to register a password for a document whose public setting is "public". For this reason, when Public is selected as the public setting 605 of the document, and the "next" button is clicked on without setting any password, an input error occurs. The document attribute information designation form is displayed again. As the document attribute information, any other setting may be possible.

When the user designates the document attribute and clicks on the "next" button (S2508 in FIG. 25), the designated document attribute information is set in the form and transmitted to the registration-side I/F unit 103-1. The registration-side I/F unit 103-1 analyzes and extracts each set value input in the received form to create document attribute information and transfers it to the document information managing unit 103-2 together with the user ID of the login user. The document information managing unit 103-2 saves the user ID of the user who has registered the document, the document attribute information, and the document file in association with each other, issues a document ID, and returns it to the registration-side I/F unit 103-1. The registration-side I/F unit 103-1 creates a document ID notification form containing the document ID and returns the form to the Web browser 102-1 (S2517 in FIG. 25). The document ID notification window is displayed on the Web browser 102-1 (FIG. 7; S2509 in FIG. 25).

Figure 7:
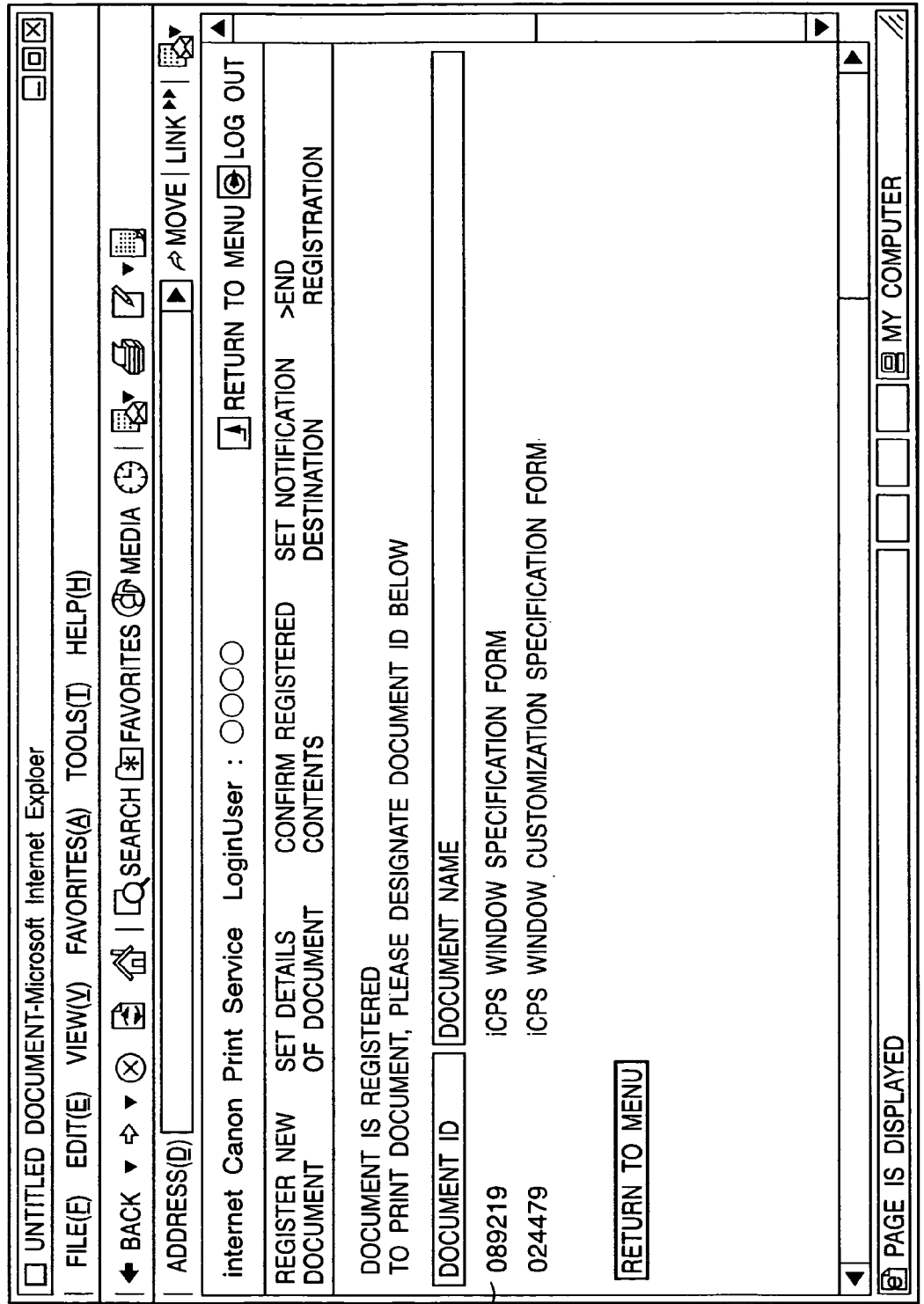
FIG. 7 is a view showing an example of a document ID notification window in the document registration form of the document providing system according to the embodiment of the present invention.
Figure 8:
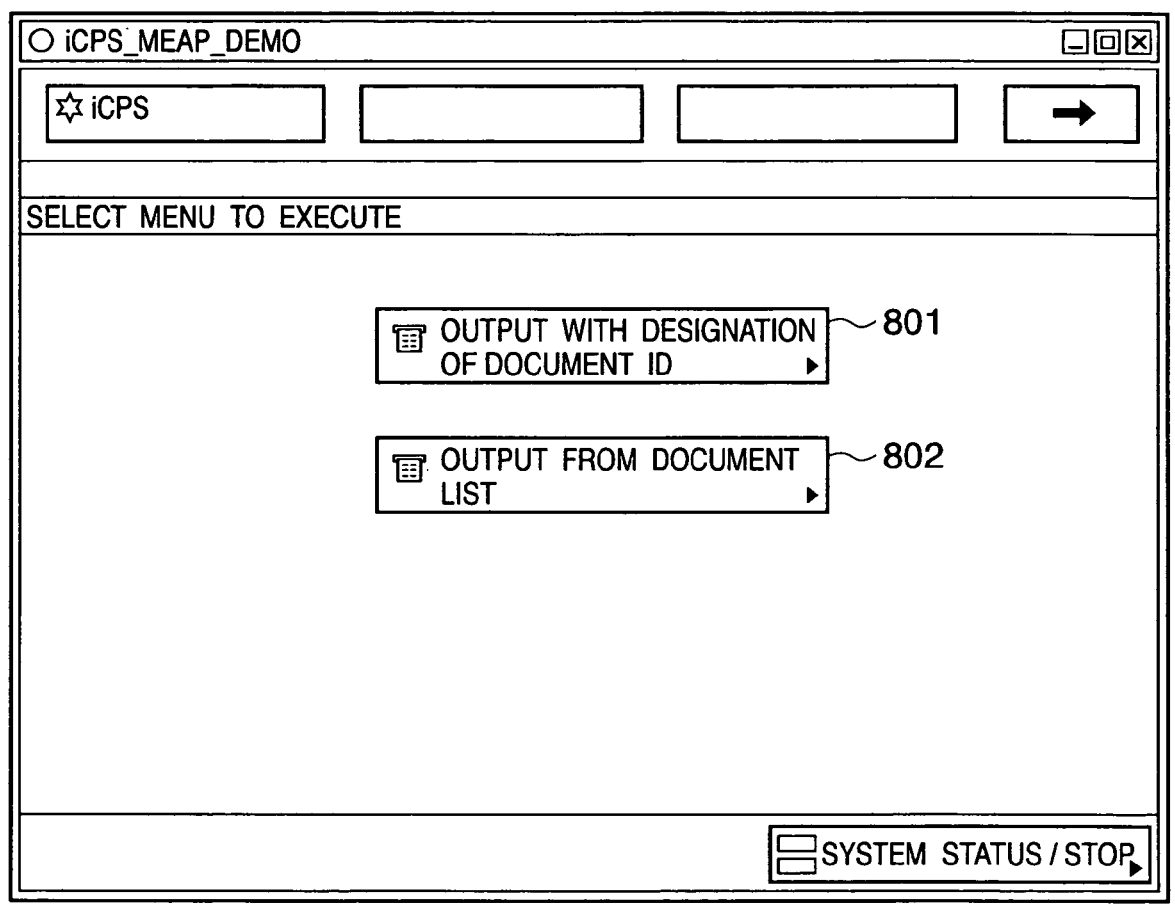
FIG. 8 is a view showing an example of a menu selection window in the print instruction of the document providing system according to the embodiment of the present invention.

The user who sees the window shown in FIG. 7 can print the document by using the document ID (document ID 701) displayed on the document ID notification window.

Print Processing

Figure 26:
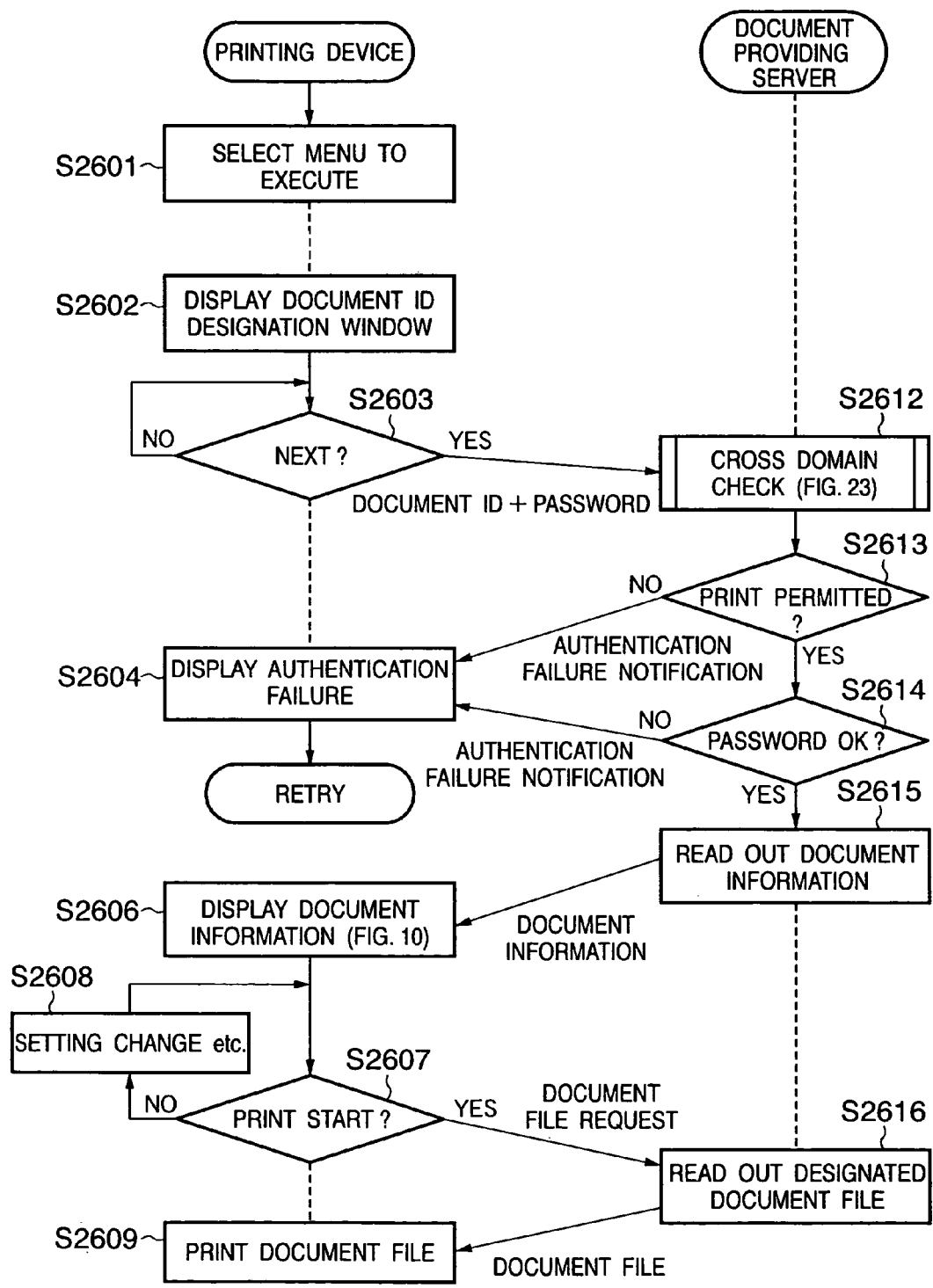
FIG. 26 is a sequence chart in designating a document from the document providing system server and printing the document.
Figure 27:
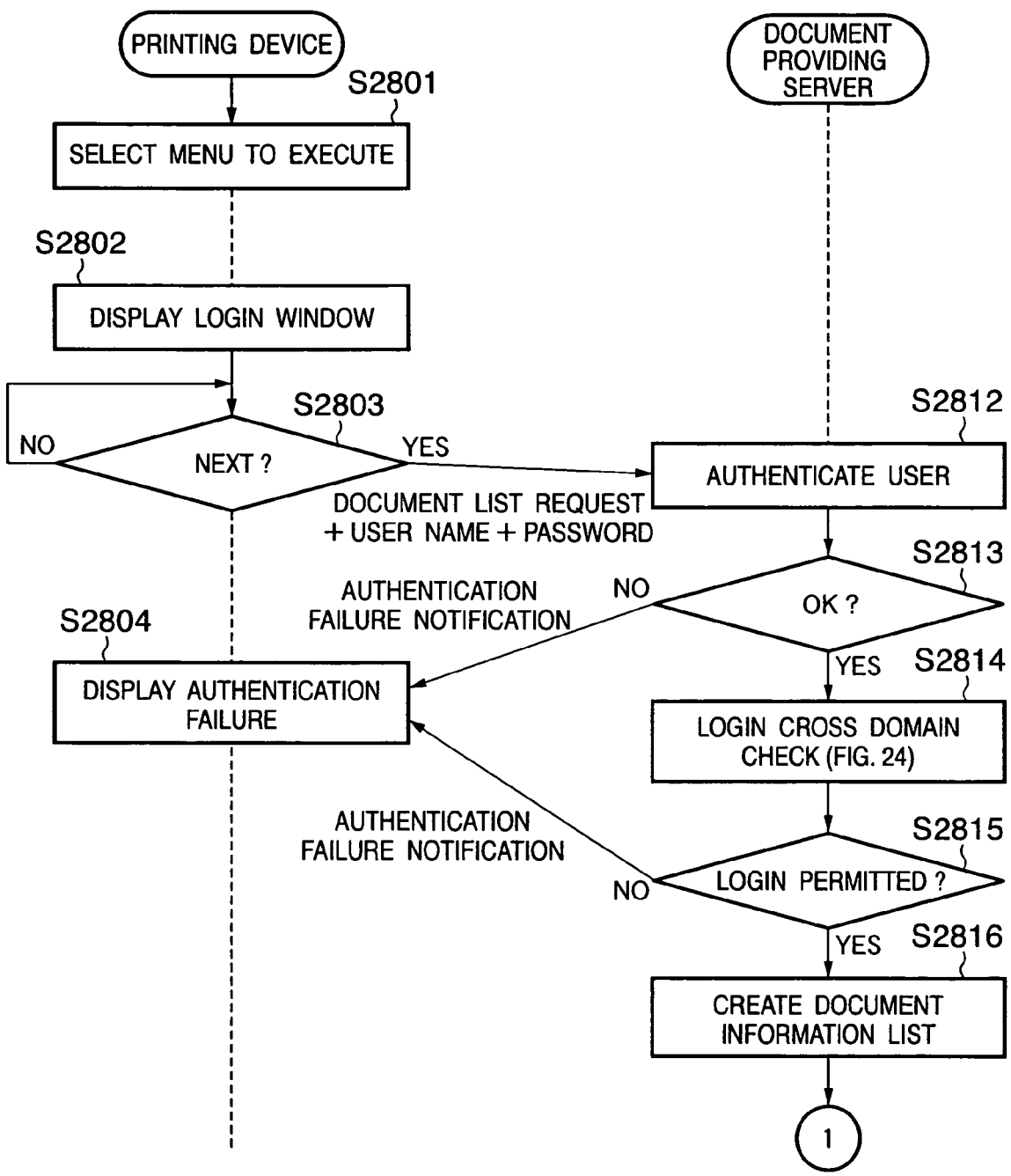
FIG. 27 is a sequence chart in acquiring a document list from the document providing system server, designating a document from the list, and printing the document.
Figure 28:
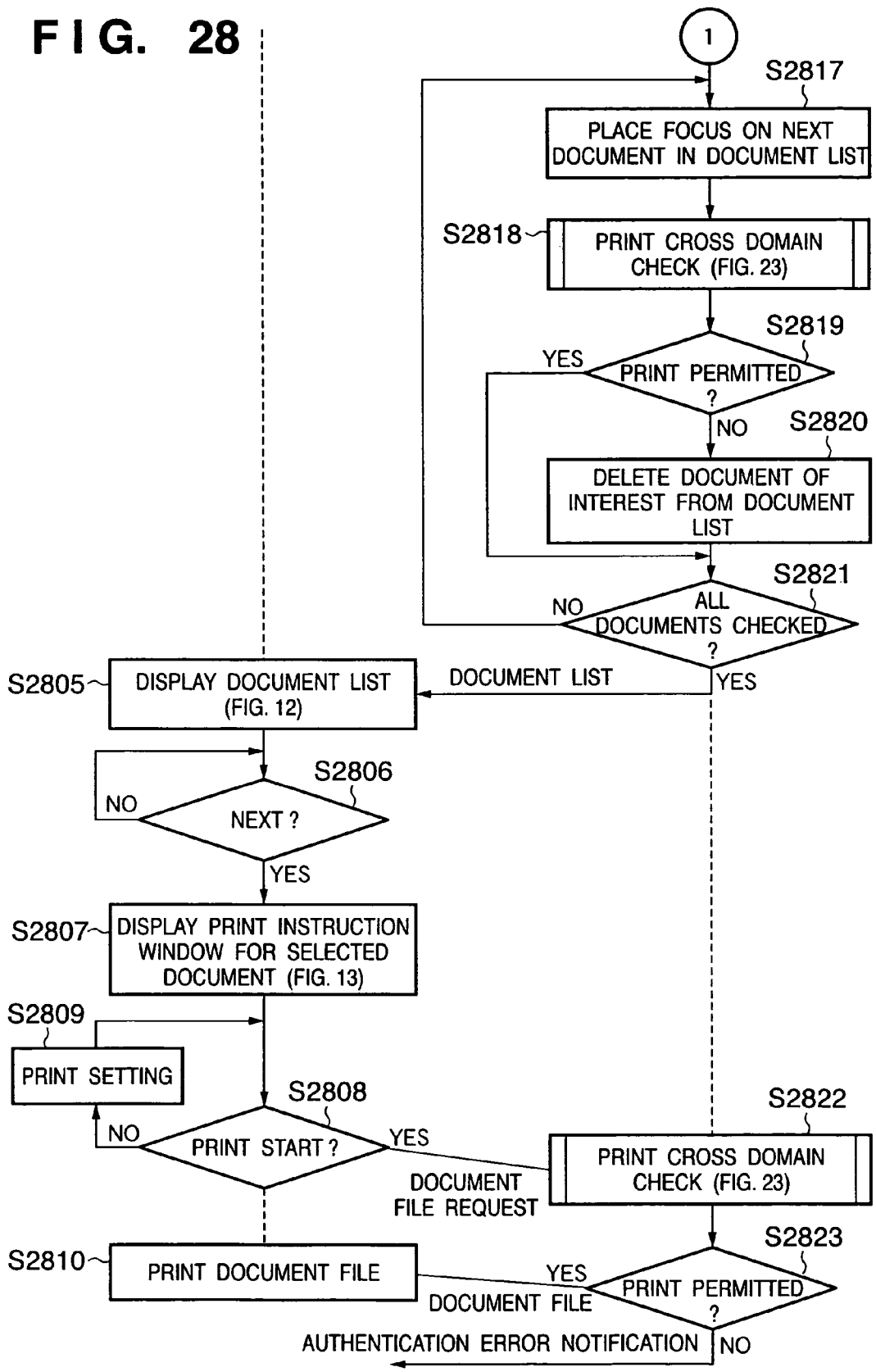
FIG. 28 is a sequence chart in acquiring a document list from the document providing system server, designating a document from the list, and printing the document.

The flow of processing in document printing will be described next with reference to FIGS. 2, 8 to 13, 23, 24, and 26 to 28. FIG. 26 shows a sequence in designating a document file by a document ID and printing the document. FIGS. 27 and 28 show a sequence in requesting a document file list from the document providing server and selecting a document file to be printed from the list. In the sequence charts, a term "document providing server" is used without considering the modules in the server. The print instruction application is described as a printing device.

The user requests document printing through the print instruction application 104-1 by operating an operation unit of touch panel type attached to the printing device 104. A menu selection window (FIG. 8) is displayed on the touch panel attached to the printing device 104. The user selects printing by designating a document ID (801) or printing by selecting a print document from a list of documents registered by him/her (802).

Printing by Designating Document

Figure 9:
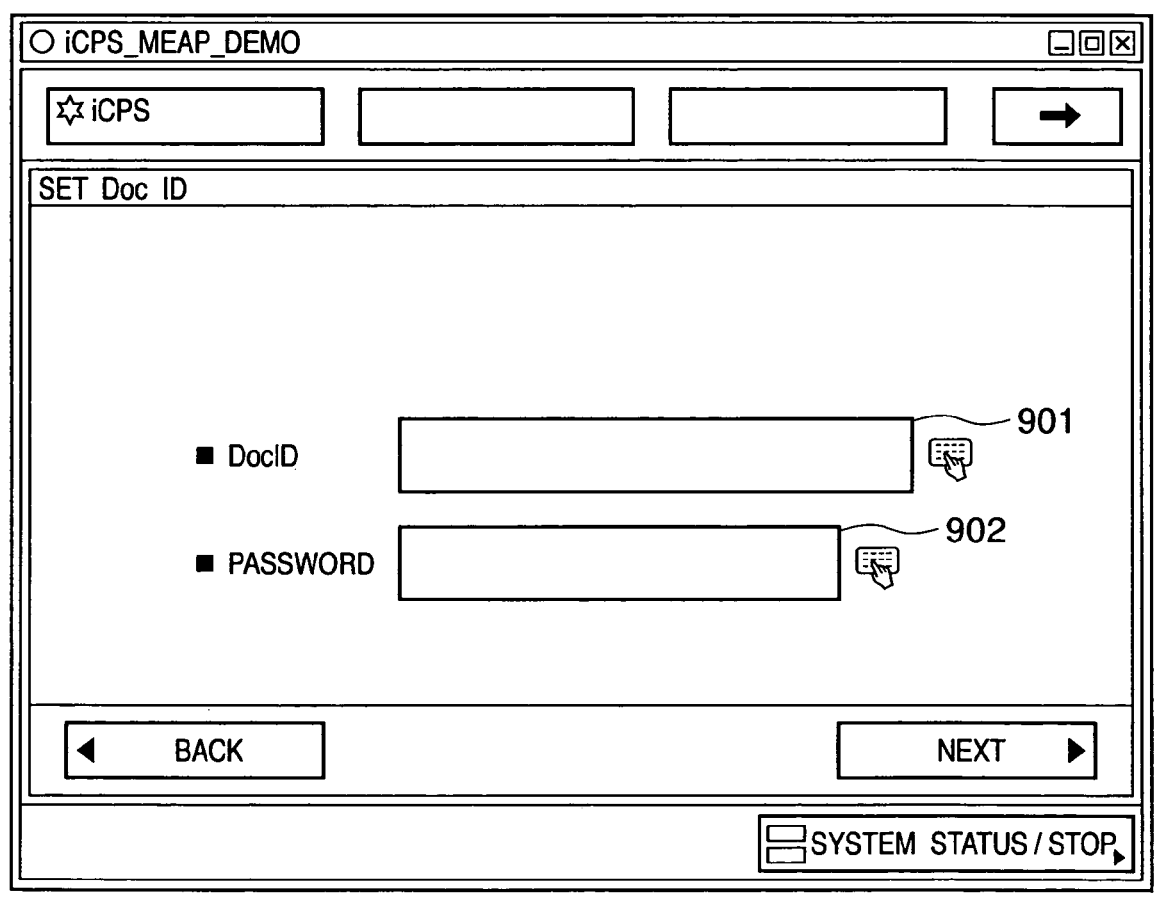
FIG. 9 is a view showing an example of a document ID designation window in the print instruction of the document providing system according to the embodiment of the present invention.

When the user selects printing by designating a document ID (801), a document ID designation window shown in FIG. 9 is displayed on the touch panel of the printing device (S2602 in FIG. 26). The user inputs, in a field 901, a desired document ID recognized on the document ID notification window (FIG. 7). When password is set for the document, the user inputs the password in a field 902. Input of the document ID and password is done from, e.g., a keyboard (or software keyboard using the touch panel) provided on the printing device operation unit.

When the "next" button is pressed, the print instruction application 104-1 transmits, to the output-side I/F unit 103-3, the designated document ID, password, and a device ID assigned to the printing device as a processing target (S2603 in FIG. 26). The output-side I/F unit 103-3 issues a document information acquisition request to the document information managing unit 103-2 by designating the document ID, password, and device ID. The document information managing unit 103-2 searches for the document information of the document associated with the designated document ID, acquires the "registration user ID" (1503) and public setting (1509) from the document information, and transmits them to the domain managing unit 103-4 together with the device ID to inquire about print permission. The domain managing unit 103-4 searches the user information table for user information associated with the registration user ID, acquires the "user's domain" (1604), and also searches for and acquires the "Limited Public of the registered document" (2102). In addition, the domain managing unit 103-4 searches the printing device management table for printing device management information associated with the registration device ID, acquires the domain (2002) and public setting (2003) of the printing device, and also searches for and acquires the "Limited Public of the printing device" (2103). On the basis of these pieces of information, the domain managing unit 103-4 executes cross domain check for printing to determine whether printing is permitted (step S2612 in FIG. 26).

Cross Domain Check (for Printing)

The flow of cross domain check for printing will be described with reference to FIG. 23. Procedures (S2300) of acquiring necessary information have already been described above, and a description will begin from step S2301. The document to be printed will be referred to as a target document, and the printing device to be used will be referred to as a target printing device. In step S2301, it is checked whether the "domain" (1604) of the user who has registered the target document matches the "domain" (2002) of the target printing device. If the domains match, printing is permitted, and the determination is ended. If the domains do not match, the flow advances to step S2302. In step S2302, the public setting (1509) of the target document is checked. If the public setting is Private, printing is inhibited, and the determination is ended (a document set to Private cannot be printed by a printing device of another domain). The determination result is stored in a predetermined storage area. If the public setting is Public, the flow advances to step S2303. In step S2303, the public setting (2003) of the target printing device is checked. If the public setting is Private, printing is inhibited, and the determination is ended. If the public setting is Public, the flow advances to step S2304. In step S2304, the "Limited Public of the registered document" (2102) of the domain of the user who has registered the target document is checked. If no Limited Public is set, the flow advances to step S2306. If the "Limited Public of the registered document" is set, the flow advances to step S2305. In step S2305, it is checked whether the domain of the target printing device is contained in the "Limited Public of the registered document" (2102). If the domain is not contained, printing is inhibited, and the determination is ended. If the domain is contained, the flow advances to step S2306. In step S2306, the "Limited Public of the printing device" (2103) of the domain of the target printing device is checked. If no Limited Public is set, printing is permitted, and the determination is ended. If the "Limited Public of the printing device" (2103) is set, the flow advances to step S2307. In step S2307, it is checked whether the domain (1604) of the user who has registered the target document is contained in the "Limited Public of the printing device" (2103) of the domain of the target printing device. If the domain is contained, printing is permitted. If the domain is not contained, printing is inhibited, and the determination is ended.

The domain managing unit 103-4 returns the result of cross domain check to the document information managing unit 103-2. Upon receiving a print permission (step S2613 in FIG. 26), the document information managing unit 103-2 checks whether the password is authentic (step S2614 in FIG. 26). If the password is authentic, the document information is returned to the print instruction application 104-1 through the output-side I/F unit 103-3 (S2615 in FIG. 26) and displayed on the print instruction application 104-1 (FIG. 10; step S2606 in FIG. 26).

Figure 14:
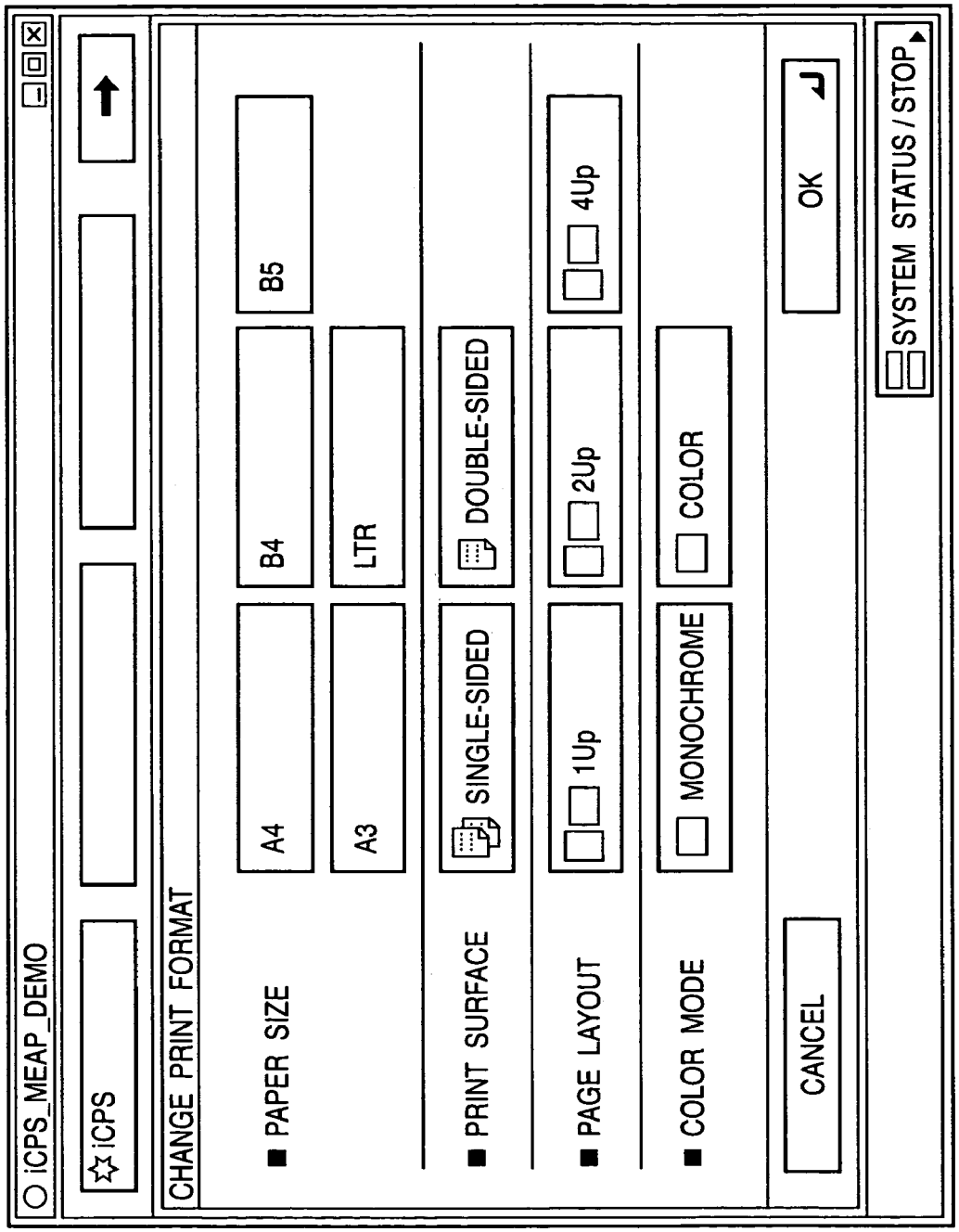
FIG. 14 is a view showing an example of a print format designation window in the print instruction of the document providing system according to the embodiment of the present invention.

In the window shown in FIG. 10, document's detailed information display 1002, print format designation 1003, and copy count designation 1004 can be done (step S2608 in FIG. 26). FIG. 14 shows a print format setting window.

When a "print start" button 1001 in FIG. 10 is pressed, the print instruction application 104-1 issues a document file acquisition request to the output-side I/F unit 103-3 by designating a document ID (S2607 in FIG. 26). Upon receiving the request, the output-side I/F unit 103-3 issues a document acquisition request to the document information managing unit 103-2. The document information managing unit 103-2 searches for the document information of the document associated with the designated document ID, acquires the "registration user ID" (1503) and public setting (1509) from the document information, and transmits them to the domain managing unit 103-4 together with the device ID to inquire about print permission. The domain managing unit 103-4 executes the above-described cross domain check for printing to check whether printing is permitted and returns the result (step S2612 in FIG. 26). Only when printing is permitted, the document information managing unit 103-2 transmits the document file to the print instruction application 104-1 through the output-side I/F unit 103-3 (step S2616 in FIG. 26). The print instruction application 104-1 prints the received document file in accordance with the print format and copy count designated by the user (step S2609 in FIG. 26).

Printing by Selection from Document List

Figure 11:
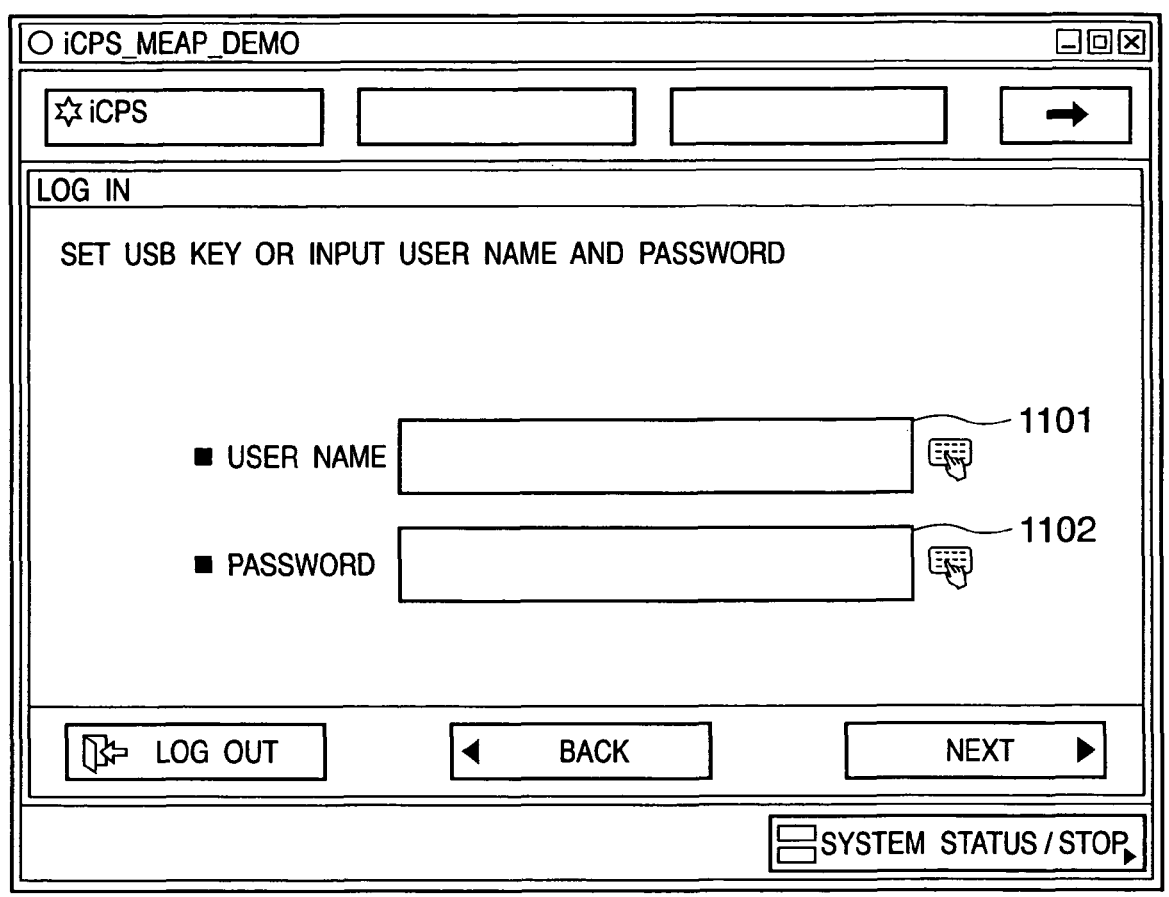
FIG. 11 is a view showing an example of a login window in the print instruction of the document providing system according to the embodiment of the present invention.

When the user selects printing by selection from a list (802) in the menu selection window (FIG. 8) (step S2801 in FIG. 27), a login window shown in FIG. 11 is displayed (S2802 in FIG. 27).

When the user inputs a user name (login ID) 1101 and password 1102 and presses the "next" button, the print instruction application 104-1 transmits a document list request, login ID, password, and device ID to the output-side I/F unit 103-3 (step S2803 in FIG. 27). The output-side I/F unit 103-3 requests the document information managing unit 103-2 to acquire a document information list by designating these pieces of information. The document information managing unit 103-2 outputs an authentication processing request to the domain managing unit 103-4. The domain managing unit 103-4 searches for user information associated with the user ID to confirm that the user is registered in the system and checks whether the password is authentic (step S2812 in FIG. 27). If the password is authentic (step S2813 in FIG. 27), the domain (1604) is acquired from the obtained user information, and the "Limited Public of the registered document" (2102) of the user's domain is searched for and acquired. In addition, printing device management information associated with the designated device ID is searched for. The domain (2002), the public setting (2003), and the "Limited Public of the printing device" (2103) of the domain to which the target printing device belongs are searched for and acquired. At this time, cross domain check for login is executed (step S2814 in FIG. 27).

Cross Domain Check (for Login)

Cross domain check for login will be described with reference to FIG. 24. In step S2401, it is checked whether the "domain" (1604) of the login user matches the "domain" (2002) of the target printing device. If the domains match, login is permitted, and the determination is ended. If the domains do not match, the flow advances to step S2402. In step S2402, the public setting (2003) of the target printing device is checked. If the public setting is Private, login is inhibited, and the determination is ended. If the public setting is Public, the flow advances to step S2403. In step S2403, the "Limited Public of the registered document" (2102) of the user's domain is checked. If no "Limited Public" is set, the flow advances to step S2405. If the "Limited Public of the registered document" is set, the flow advances to step S2404. In step S2404, it is checked whether the domain of the target printing device is contained in the "Limited Public of the registered document" (2102). If the domain is not contained, login is inhibited, and the determination is ended. If the domain is contained, the flow advances to step S2405. In step S2405, the "Limited Public of the printing device" (2103) of the domain of the target printing device is checked. If no "Limited Public" is set, login is permitted, and the determination is ended. If the "Limited Public of the printing device" (2103) is set, the flow advances to step S2406. In step S2406, it is checked whether the user's domain (1604) is contained in the "Limited Public of the printing device" (2103) of the domain of the target printing device. If the domain is contained, login is permitted. If the domain is not contained, login is inhibited, and the determination is ended.

The domain managing unit 103-4 returns the result of cross domain check to the document information managing unit 103-2. Only when login is permitted, the document information managing unit 103-2 continues the processing. If login is rejected, the document information managing unit 103-2 returns an authentication error to the print instruction application 104-1 (step S2815 in FIG. 27).

When login is permitted, documents registered by the designated user are searched for to create a document information list (step S2816 in FIG. 27). In addition, the domain managing unit 103-4 is requested to execute cross domain check for printing for each document in the created document information list. All documents for which printing is inhibited are deleted from the document list (steps S2817, to S2811 in FIG. 28). A next document in step S2817 is a next document in the document list and indicates the first document in the document list when step S2817 is executed for the first time.

Figure 12:
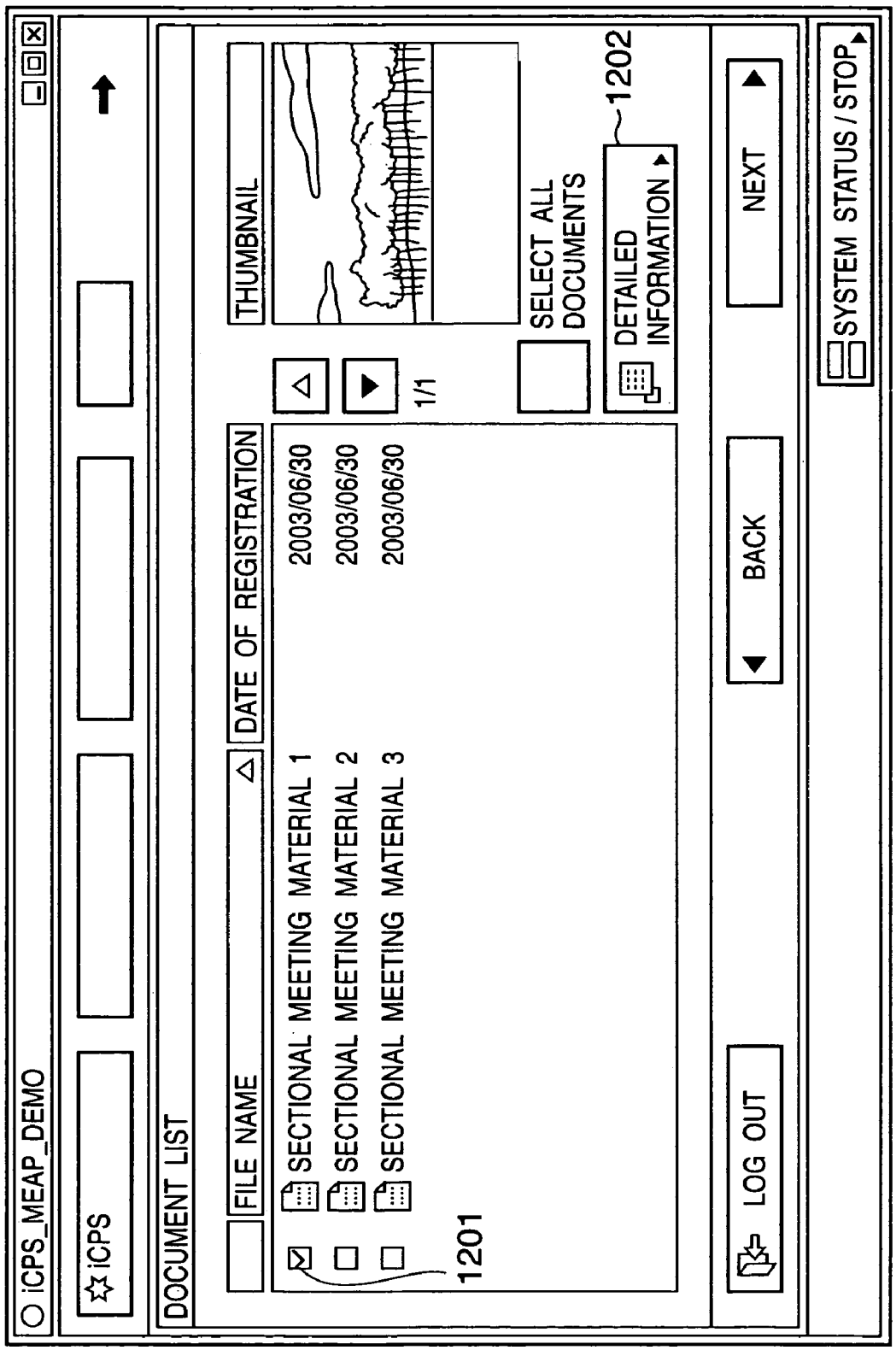
FIG. 12 is a view showing an example of a print document selection window in the print instruction of the document providing system according to the embodiment of the present invention.

A document information list created as a result is returned to the output-side I/F unit 103-3. The output-side I/F unit 103-3 returns the document information list to the print instruction application 104-1 (step S2821 in FIG. 28). The document list is displayed on the print instruction application 104-1 (FIG. 12; step S2805 in FIG. 28). Referring to FIG. 12, a desired document to be printed can be selected from a document list 1201. With a button 1202, the detailed information of the document can be displayed. When a document is selected, and the "next" button is pressed in FIG. 12 (step S2806 in FIG. 28), a print instruction window shown in FIG. 13 is displayed (step S2807 in FIG. 28).

Figure 13:
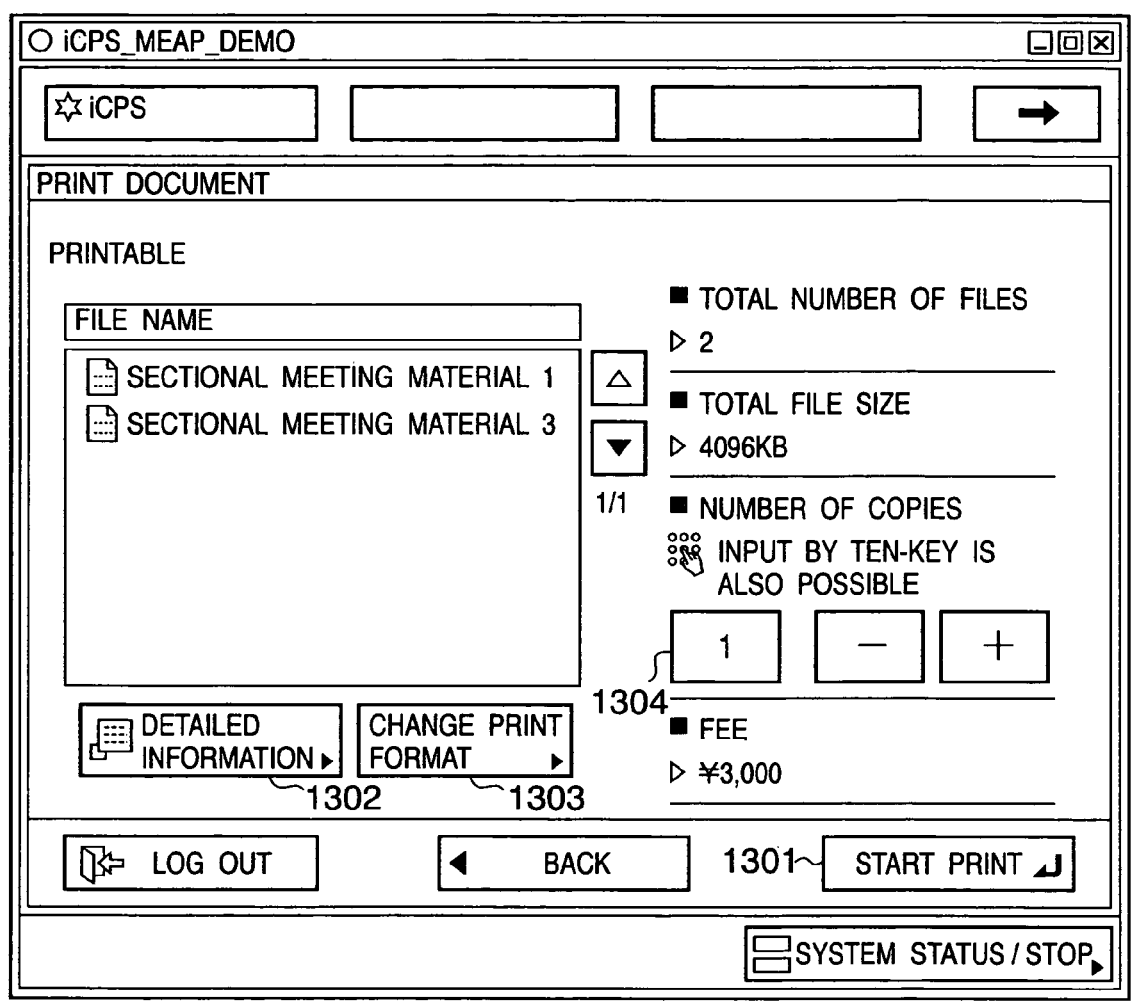
FIG. 13 is a view showing an example of a print setting designation window in selecting multiple documents in the print instruction of the document providing system according to the embodiment of the present invention.

In the window shown in FIG. 13, document's detailed information display 1302, print format designation 1303, and copy count designation 1304 can be done (step S2809 in FIG. 28). FIG. 14 shows a print format setting window. When a "print start" button 1301 in FIG. 13 is pressed, the print instruction application 104-1 issues a document file acquisition request to the output-side I/F unit 103-3 by designating a document ID (S2808 in FIG. 28).

Upon receiving the request, the output-side I/F unit 103-3 issues a document acquisition request to the document information managing unit 103-2. The document information managing unit 103-2 searches for the document information of the document associated with the designated document ID, acquires the "registration user ID" (1503) and public setting (1509) from the document information, and transmits them to the domain managing unit 103-4 together with the device ID to inquire about print permission. The domain managing unit 103-4 executes the above-described cross domain check for printing to check whether printing is permitted and returns the result (step S2822 in FIG. 28). Only when printing is permitted, the document information managing unit 103-2 transmits the document file to the print instruction application 104-1 through the output-side I/F unit 103-3 (step S2823 in FIG. 28). The print instruction application 104-1 prints the received document file in accordance with the print format and copy count designated by the user (step S2820 in FIG. 28). The reason why cross domain check for printing is executed here for the second time is as follows. The document providing system server 103 handles a document information acquisition request, document list acquisition request, and document acquisition request as separate requests. If cross domain check is not executed upon receiving a document acquisition request, and a print instruction application which acquires a document without acquiring document information or document list is present, cross domain check is not executed. In addition, if the second cross domain check is executed, check for the latest setting can be done in acquiring a document even when public setting of document information or printing device management information or Limited Public setting of domain information is changed after the first cross domain check (step S2818 in FIG. 28).

With the above-described procedures, the document providing system of this embodiment can set a public domain for each of the printing device and document (strictly speaking, the user who has registered the document). If public setting is "private", the public domain is the same as the domain to which the document or device belongs. If public setting is "public" (except "limited public"), the public domain includes all domains. If public setting is "limited public", the public domain is a designated domain. A printing device is allowed to print only a document which belongs to its public domain. Conversely, a document can be printed only by a printing device which belongs to its public domain. Only when printing is permitted for both the printing device and the document, printing is permitted. This is cross domain check. With this cross domain check, the printing device which is permitted to print a document and a document which can be printed by a printing device can strictly and easily be managed. The cross domain check is executed not only for print permission but also for user login.

Referring to FIG. 26, password authentication may be done before cross domain check. Referring to FIG. 27, user authentication may be done after cross domain check.

Modification

In the embodiment, public setting of a document file and printing device includes three categories (public categories), i.e., "private", "public", and "limited public". In "limited public", the public domain is individually set. It is only for the sake of convenience of the user, and the same management as in the embodiment is possible even when the categories "private" and "public" are not present. More specifically, only "limited public" is used as the public setting for both a document file and a printing device (that is, it is always necessary to designate the public domain). To set the public category to "private" in this case, only the domain of the printing device or document is set as the public domain. For example, when the domain to which a printing device belongs is the domain A, the public setting of the printing device is set to "public". Only the domain A is registered as the "limited public of the printing device" in the domain information of the domain A. With this setting, the printing device has the same public domain as that when the public setting is set to "private". To set "public", all domains are set as the public domain. In this case, the same public categories as "private" and "public" can be set even without providing the public categories "private" and "public".

Conversely speaking, in the above-described embodiment, when the public setting of a printing device is "private", the domain (device-corresponding-domain, i.e., the public domain of the device) to which a document permitted for the printing device belongs is regarded to be only the domain to which the printing device belongs. When the public setting of a printing device is "public", and no device-corresponding-domain is set (i.e., when no limited public domain is designated), the device-corresponding-domain is regarded to be all domains. When the public setting of a printing device is "public", and a device-corresponding-domain is set (i.e., when a limited public domain is designated), the device-corresponding-domain is regarded to be a domain which is set as a limited public domain. Cross domain check is executed in this way. This also applies to the domain of a document.

In the above-described embodiment, there is no domain to which a document belongs. A document is handled as a subordinate belonging to the domain to which its registration user belongs. However, more generally, a document itself can have a domain so that domains can be set for all printers, documents, and users. A public domain (i.e., a domain to be subjected to cross domain check) can be set for each of the relationship between a printer and a document and that between a printer and a user. From such a viewpoint, the arrangement of the above-described embodiment can be regarded as a special case wherein the domain of a user is applied as the domain of a document (i.e., the document's domain is subordinate to the user's domain).

As described above, in the document providing system which causes a predetermined server apparatus to transmit a document to a printing device installed in, e.g., a store or hotel and causes the printing device to print and output the document, a high security level can be ensured by limiting printing devices capable of outputting a document, and any illicit use can be prevented by limiting documents outputtable by a printing device. In addition, only the domain administrator is allowed to set Limited Public, information leakage can be minimized. Furthermore, with simple setting not to degrade the convenience, printing devices, users, and documents can more efficiently and effectively be managed.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-252903 filed on Aug. 31, 2004 and 2005-234702 filed on Aug. 12, 2005 which are hereby incorporated by reference herein.

What is claimed is:

1. A document management server, comprising:

a management unit configured to manage device management information for each printer and document management information for each document file, wherein the device management information associates a domain to which a printer belongs with at least one domain, assigned to the printer, to which at least one document file belongs, and the document management information associates a domain to which a document file belongs with at least one domain, assigned to the document file, to which at least one printer belongs;

a reception unit configured to receive a print instruction for a selected document file selected by a user from a selected printer that has received a print request from a user;

a print permission determination unit configured to;

i) determine whether or not a domain to which the selected printer belongs and a domain to which the selected document file belongs are the same by referring to the document management information and the device management information managed by said management unit, in response to the print instruction received by said reception unit, ii) decide to permit printing if the domains are determined to be the same, iii) decide to permit printing, if the domains are determined not to be the same, when the domain to which the selected document file belongs is included in domains associated with the domain to which the selected printer belongs and the domain to which the selected printer belongs is included in domains associated with the domain to which the selected document file belongs, and iv) decide to inhibit printing otherwise;

a transmission unit configured to transmit the selected document file to the selected printer if printing is permitted, and transmit a notification of an authentication failure to the selected printer if printing is inhibited.

2. The server according to claim 1, wherein the device management information further includes a device publication setting and the document management information further includes a document publication setting, wherein the domains associated with the domain to which the selected printer belongs is the domain to which the selected printer belongs regardless of the domains associated with the domain to which the printer belongs that is set in the device management information if the device publication setting is set to PRIVATE, the domains associated with the domain to which the selected printer belongs are all domains regardless of the domains associated with the domain to which the printer belongs that is set in the device management information if the device publication setting is set to PUBLIC and the domains associated with the domain to which the selected printer belongs is not set in the device management information, and the domains associated with the domain to which the selected printer belongs accord with the domains associated with the domain to which the printer belongs that is set in the device management information if the device publication setting is set to PUBLIC and the domains associated with the domain to which the selected printer belongs is set in the device management information by a user, and wherein the domains associated with the domain to which the selected document belongs is the domain to which the selected document belongs regardless of the domains associated with the domain to which the document belongs that is set in the document management information if the document publication setting is set to PRIVATE, the domains associated with the domain to which the selected document belongs are all domains regardless of the domains associated with the domain to which the document belongs that is set in the document management information if the document publication setting is set to PUBLIC and the domains associated with the domain to which the selected document belongs is not set in the document management information, and the domains associated with the domain to which the selected document belongs accord with the domains associated with the domain to which the document belongs that is set in the document management information if the document publication setting is set to PUBLIC and the domains associated with the domain to which the selected document belongs is set in the document management information by a user.

3. The server according to claim 1, wherein the domain to which the document file belongs is a domain to which a user belongs who has registered the document file in the document management server.

4. A document management method executed by a document management server, comprising:

a management step of managing device management information for each printer and document management information for each document file, wherein the device management information associates a domain to which a printer belongs with at least one domain, assigned to the printer, to which at least one document file belongs, and the document management information associates a domain to which a document file belongs with at least one domain, assigned to the document file, to which at least one printer belongs;

a reception step of receiving a print instruction for a selected document file selected by a user from a selected printer that has received a print request from a user;

a print permission determination step of;

i) determining whether or not a domain to which the selected printer belongs and a domain to which the selected document file belongs are the same by referring to the document management information and device management information managed in said management step, in response to the print instruction received in said reception step, ii) deciding to permit printing if the domains are determined to be the same, iii) deciding to permit printing, if the domains are determined not to be the same, when the domain to which the selected document file belongs is included in domains associated with the domain to which the selected printer belongs and the domain to which the selected printer belongs is included in domains associated with the domain to which the selected document file belongs, and iv) deciding to inhibit printing otherwise; and a transmission step of transmitting the selected document file to the selected printer if printing is permitted, and transmit a notification of an authentication failure to the selected printer if printing is inhibited.

5. The method according to claim 4, wherein the device management information further includes a device publication setting and the document management information further includes a document publication setting, wherein the domains associated with the domain to which the selected printer belongs is the domain to which the selected printer belongs regardless of the domains associated with the domain to which the printer belongs that is set in the device management information if the device publication setting is set to PRIVATE, the domains associated with the domain to which the selected printer belongs are all domains regardless of the domains associated with the domain to which the printer belongs that is set in the device management information if the device publication setting is set to PUBLIC and the domains associated with the domain to which the selected printer belongs is not set in the device management information, and the domains associated with the domain to which the selected printer belongs accord with the domains associated with the domain to which the printer belongs that is set in the device management information if the device publication setting is set to PUBLIC and the domains associated with the domain to which the selected printer belongs is set in the device management information by a user, and wherein the domains associated with the domain to which the selected document belongs is the domain to which the selected document belongs regardless of the domains associated with the domain to which the document belongs that is set in the document management information if the document publication setting is set to PRIVATE, the domains associated with the domain to which the selected document belongs are all domains regardless of the domains associated with the domain to which the document belongs that is set in the document management information if the document publication setting is set to PUBLIC and the domains associated with the domain to which the selected document belongs is not set in the document management information, and the domains associated with the domain to which the selected document belongs accord with the domains associated with the domain to which the document belongs that is set in the document management information if the document publication setting is set to PUBLIC and the domains associated with the domain to which the selected document belongs is set in the document management information by a user.

6. The method according to claim 4, wherein the domain to which the document file belongs is a domain to which a user belongs who has registered the document file in the document management server.

7. A non-transitory computer readable medium retrievably storing a computer program therein for causing a computer to execute a document management method, said method comprising a management step of managing device management information for each printer and document management information for each document file, wherein the device management information associates a domain to which a printer belongs with at least one domain, assigned to the printer, to which at least one document file belongs, and the document management information associates a domain to which a document file belongs with at least one domain, assigned to the document file, to which at least one printer belongs;

a reception step of receiving a print instruction for a selected document file selected by a user from a selected printer that has received a print request from a user;

a print permission determination step of:

i) determining whether or not a domain to which the selected printer belongs and a domain to which the selected document file belongs are the same by referring to the document management information and device management information managed in said management step, in response to the print instruction received in said reception step, ii) deciding to permit printing if the domains are determined to be the same, iii) deciding to permit printing, if the domains are determined not to be the same, when the domain to which the selected document file belongs is included in domains associated with the domain to which the selected printer belongs and the domain to which the selected printer belongs is included in domains associated with the domain to which the selected document file belongs, and iv) deciding to inhibit printing otherwise; and a transmission step of transmitting the selected document file to the selected printer if printing is permitted, and transmit a notification of an authentication failure to the selected printer if printing is inhibited.

* * * * *